US012754368B2

(12) United States Patent
Huang et al.

(10) Patent No.: US 12,754,368 B2
(45) Date of Patent: Oct. 6, 2026

(54) SEMICONDUCTOR STRUCTURE AND METHOD FOR MEASURING THE OPTICAL DIE

(71) Applicant: TAIWAN SEMICONDUCTOR MANUFACTURING COMPANY LTD., Hsinchu (TW)

(72) Inventors: Tai-Chun Huang, New Taipei City (TW); Chia-Ju Yu, Taichung City (TW); Stefan Rusu, Sunnyvale, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 544 days.

(21) Appl. No.: 18/346,841

(22) Filed: Jul. 4, 2023

(65) Prior Publication Data

US 2025/0012970 A1 Jan. 9, 2025

(51) Int. Cl.

*G02B 6/122* (2006.01)
*G02B 6/12* (2006.01)
*G02B 6/26* (2006.01)

(52) U.S. Cl.

CPC ............ *G02B 6/122* (2013.01); *G02B 6/262* (2013.01); *G02B 2006/121* (2013.01)

(58) Field of Classification Search

CPC ........... G02B 6/4214; G02B 6/26; G02B 6/43
See application file for complete search history.

(56) References Cited

U.S. PATENT DOCUMENTS

2016/0238801 A1* 8/2016 Lee ........................ G02B 6/136
2023/0123000 A1 4/2023 Kamineni et al.

FOREIGN PATENT DOCUMENTS

CN 114545556 A 5/2022
TW 202321748 A 6/2023

OTHER PUBLICATIONS

US 20220163583A1 is the US counterpart of CN 114545556A.
English Abstract of TW 202321748A.

* cited by examiner

*Primary Examiner* — Michael P Mooney
(74) *Attorney, Agent, or Firm* — WPAT LAW; Anthony King

(57) ABSTRACT

A semiconductor structure includes an optical die, a first edge coupler, and a reflective layer. The optical die has a top surface and an edge. The first edge coupler is disposed in the optical die and adjacent to the edge of the optical die. The reflective layer is disposed in the optical die and adjacent to the edge of the optical die. The reflective layer is disposed over the first edge coupler and separated from the first edge coupler.

20 Claims, 21 Drawing Sheets

10a

SEMICONDUCTOR STRUCTURE AND METHOD FOR MEASURING THE OPTICAL DIE

BACKGROUND

Photonic devices are used in integrated circuits (ICs) in order to carry signals from one component to another component faster than using electrical signals. Electrical signals are converted into optical signals at one end of a waveguide, the optical signals propagate along the waveguide, and the optical signals are converted back into electrical signals at another end of the waveguide. In such way, optical and electrical signaling and processing are combined for signal transmission.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1B:
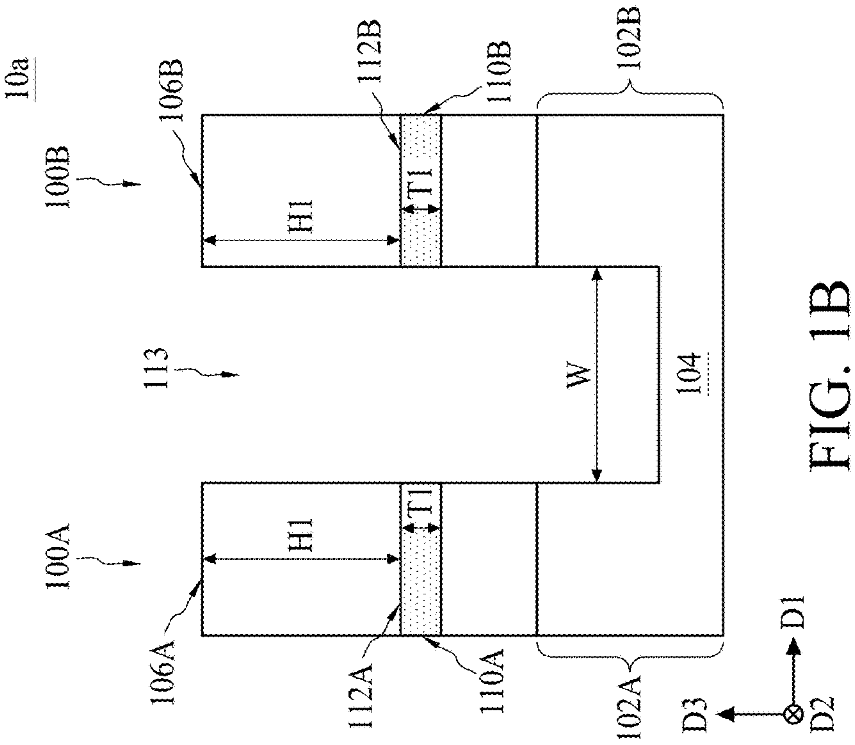
FIG. 1B is a cross-sectional view taken along a line A-A' of FIG. 1A.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective test measurements. Also, as used herein, the terms "substantially," "approximately" or "about" generally mean within a value or range that can be contemplated by people having ordinary skill in the art. Alternatively, the terms "substantially," "approximately" or "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Currently, semiconductor packages including both photonic dies (known as P-dies) and electronic dies (known as E-dies) are becoming increasingly popular for their compactness. In addition, due to wide use of optical fiber-related applications for signal transmission, optical signaling and processing have been used in increasing numbers of applications.

For example, a photonic package may be optically coupled to an optical fiber by an edge coupler. In some embodiments, the edge coupler is an optical component that allows optical signals to be coupled between a waveguide and the optical fiber mounted at an edge of the photonic package. In some embodiments, the edge coupler may continuous with the waveguide and may be formed in same processing operations as the waveguide.

In some comparative approaches, an edge polishing may be applied after a die singulation. Such approaches are expensive and time-consuming. Further, in a wafer-level measurement or a wafer-level test, various fiber and fiber holders may be applied, thereby increasing the cost.

The present disclosure therefore provides an optical die having a reflective layer for improving practicability of a wafer-level measurement or a wafer-level test. In some embodiments, during the wafer-level measurement or the wafer-level test, the reflective layer reflects an incident light to an edge coupler with an included angle formed by the incident light and the reflected light. In such embodiments, an optical fiber that provides the incident light can be kept away from the optical die due to the included angle, thus reducing a possibility of collision between the optical die and the optical fiber.

Figure 1A:
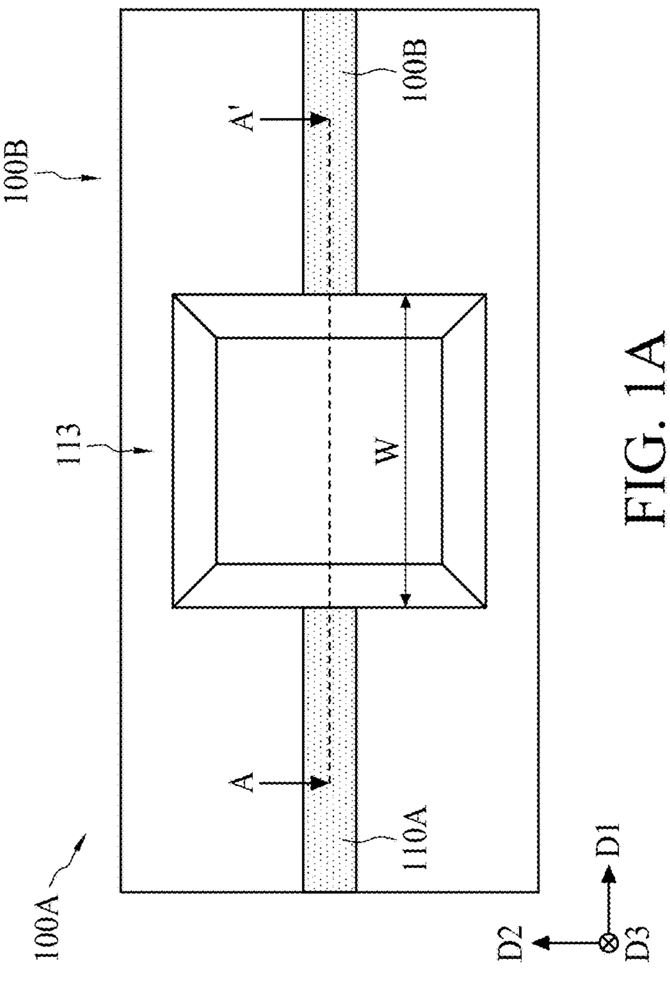
FIG. 1A is a partial top view of a semiconductor structure according to the present disclosure in one or more embodiments.

Please refer to FIGS. 1A and 1B, wherein FIG. 1A is a partial top view of a semiconductor structure according to the present disclosure in one or more embodiments; and FIG. 1B is a cross-sectional view taken along a line A-A' of FIG. 1A. In some embodiments, the semiconductor structure 10*a* includes optical dies 100A and 100B. The optical die 100A includes a photonic integrated circuit 102A, and the optical die 100B includes a photonic integrated circuit 102B. The photonic integrated circuits 102A and 102B are formed in a substrate 104. Each of the photonic integrated circuits 102A and 102B converts electrical signals to optical signals for transmission along an optical fiber (not shown), and converts optical signals from the optical fiber to electrical signals. Accordingly, each of the photonic integrated circuits 102A and 102B is responsible for input/output (I/O) of the optical signals to/from the optical fiber.

In some embodiments, the photonic integrated circuits 102A and 102B are formed using a silicon-on-insulator (SoI) substrate. Generally, an SOI substrate comprises a layer of a semiconductor material, such as silicon, formed on an insulator layer. The insulator layer may be, for example, a buried oxide (BOX) layer or a silicon oxide layer. The insulator layer is provided on a substrate, typically a silicon or glass substrate. Other substrates, such as a multi-layered or gradient substrate, may also be used.

In some embodiments, waveguides may be formed in or over the photonic integrated circuits 102A and 102B, though not shown. In some embodiments, the waveguides may be silicon waveguides formed by patterning the semiconductor material. Patterning the semiconductor material may be accomplished with acceptable photolithography and etching techniques. Dimensions of the waveguides may vary depending on applications; therefore, details thereof are omitted for brevity.

In some embodiments, the optical die 100A includes an edge coupler 110A formed in or over the photonic integrated circuit 102A, and the optical die 100B includes an edge coupler 110B formed in or over the photonic integrated circuit 102B. The edge couplers 110A and 110B allow the waveguides to transmit light to or receive light from an overlying light source or optical signal source (e.g., the optical fiber). The edge couplers 110A and 110B may be formed by acceptable photolithography and etching techniques. In an embodiment, the edge couplers 110A and 110B are formed after the waveguides are defined. In some embodiments, the edge couplers 110A and 110B respectively are bi-directional broadband couplers (BC). In some embodiments, the edge couplers 110A and 110B respectively include silicon, silicon nitride and lithium niobate ($LiNbO_3$), but the disclosure is not limited thereto.

Still referring to FIGS. 1A and 1B, in some embodiments, the edge couplers 110A and 110B respectively extend in a first direction D1. In some embodiments, the edge couplers 110A and 110B are parallel to each other in a second direction D2. Further, in some embodiments, the edge couplers 110A and 110B are aligned with each other along the second direction D2, but the disclosure is not limited thereto. Further, the edge couplers 110A and 110B are aligned with each other in a third direction D3. In some embodiments, the first direction D1, the second direction D2 and the third direction D3 are perpendicular to each other, but the disclosure is not limited thereto. In some embodiments, a top surface 112A of the edge coupler 110A is separated from a top surface 106A of the optical die 100A by a distance H1, and a top surface 112B of the edge coupler 110B is separated from a top surface 106B of the optical die 100B by the distance H1. In some embodiments, the distance H1 is between 0.05 micrometers and approximately 250 micrometers, but the disclosure is not limited thereto. The distance H1 may be modified according to various product design. In some embodiments, the edge coupler 110A and the edge coupler 110B respectively have a same thickness T1, and the thickness T1 is between approximately 100 nanometers and approximately 1,000 nanometers, but the disclosure is not limited thereto.

It should be noted that the optical dies 100A and 100B may further include elements such as back-end-of-line (BEOL) interconnect structures, redistribution structures, connecting pads, and external contacts. Additionally, other optical elements such as grating couplers may be formed in the optical dies 100A and 100B; however, details thereof are omitted for brevity.

In some embodiments, a trench 113 may be formed in the substrate 104. In some embodiments, sidewalls of the trench 113 may be referred to as an edge of the optical die 100A and an edge of the optical die 100B, but the disclosure is not limited thereto. As shown in FIGS. 1A and 1B, the edge couplers 110A and 110B are exposed through sidewalls of the trench 113. In some embodiments, the edge coupler 110A is said to be adjacent to the edge of the optical die 100A, and the edge coupler 110B is said to be adjacent to the edge of the optical die 100B. Light may pass through the trench 113 and into the edge couplers 110A and 110B. In some embodiments, a width W of the trench 113, which is also referred to as a distance between an end of the edge coupler 110A and an end of the edge coupler 110B, is between approximately 50 micrometers and 1,000 micrometers, but the disclosure is not limited thereto. In some embodiments, a depth of the trench 113 may vary depending on applications as long as the edge couplers 110A and 110B are exposed; therefore, details thereof are omitted for brevity. Additionally, the substrate 104 be may be exposed through a bottom of the trench 113, but the disclosure is not limited thereto.

Figure 2B:
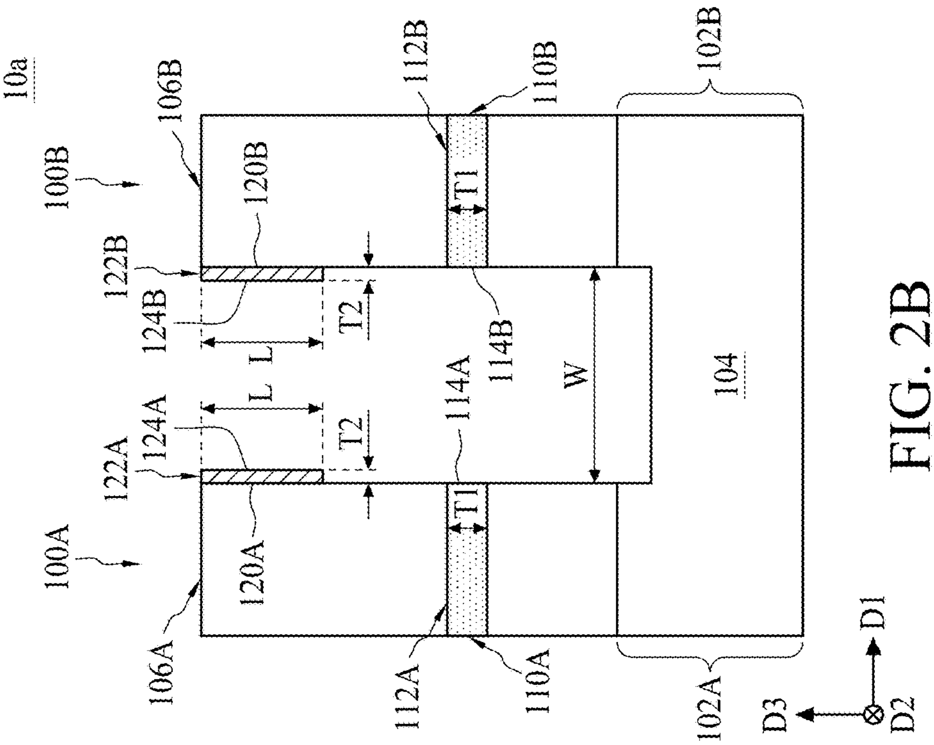
FIG. 2B is a cross-sectional view taken along a line A-A' of FIG. 2A.
Figure 2A:
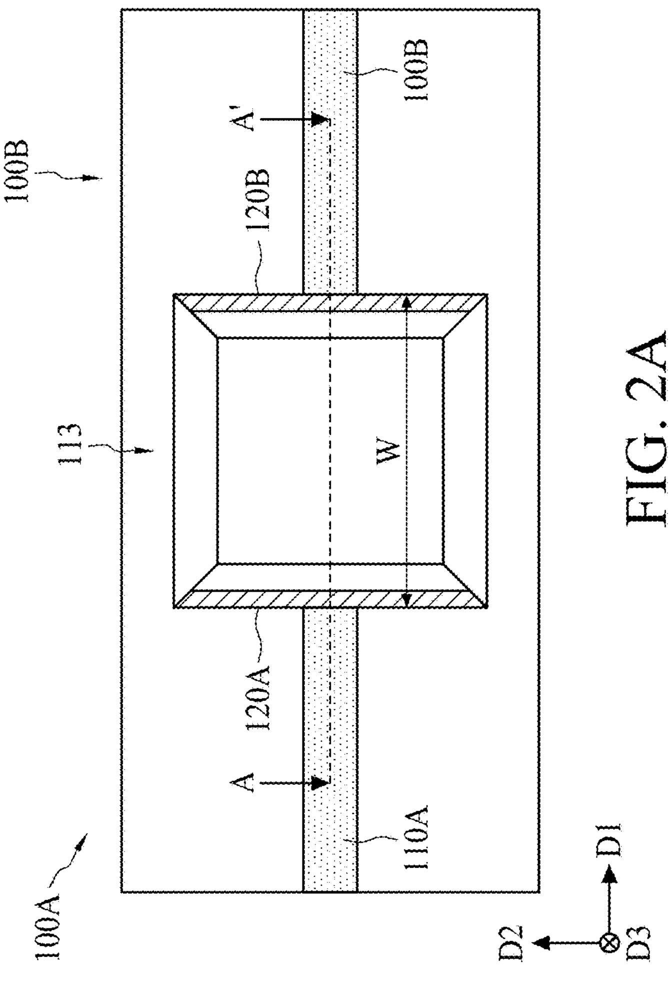
FIG. 2A is a partial top view of a semiconductor structure according to the present disclosure in one or more embodiments.

Referring to FIGS. 2A and 2B, in some embodiments, reflective layers 120A and 120B are formed at opposite sidewalls of the trench 113. The reflective layers 120A and 120B may include metal layers. For example, the reflective layers 120A and 120B may include gallium nitride (GaN), aluminum (Al), copper (Cu) and silver (Ag), but the disclosure is not limited thereto. In some embodiments, the forming of the reflective layers 120A and 120B may be accomplished with acceptable photolithography and etching techniques, and details thereof are omitted for brevity.

Further, the reflective layers 120A and 120B are disposed over the edge couplers 110A and 110B, respectively. For example, the reflective layer 120A is disposed over the edge coupler 110A, and the reflective layer 120B is disposed over the edge coupler 110B. Further, the reflective layer 120A is separated from the edge coupler 110A, and the reflective layer 120B is separated from the edge coupler 110B. As shown in FIG. 2A, the reflective layers 120A and 120B respectively extend in the second direction D2. In such embodiments, an extending direction of the reflective layers 120A and 120B is perpendicular to an extending direction of the edge couplers 110A and 110B from a plan view.

In some embodiments, a top surface 122A of the reflective layer 120A is level with the top surface 106A of the optical die 100A, and a top surface of the reflective layer 120B is level with the top surface 106B of the optical die 100B, as shown in FIG. 2B. However, referring to FIG. 5A, in some embodiments, the top surface 122A of the reflective layer 120A is separated from the top surface 106A of the optical die 100A by a distance H2, and the top surface 122B of the reflective layer 120B is separated from the top surface 106B of the optical die 100B by the distance H2. The distance H2 is between approximately 0 micrometer and approximately 50 micrometers, but the disclosure is not limited thereto.

Figure 3A:
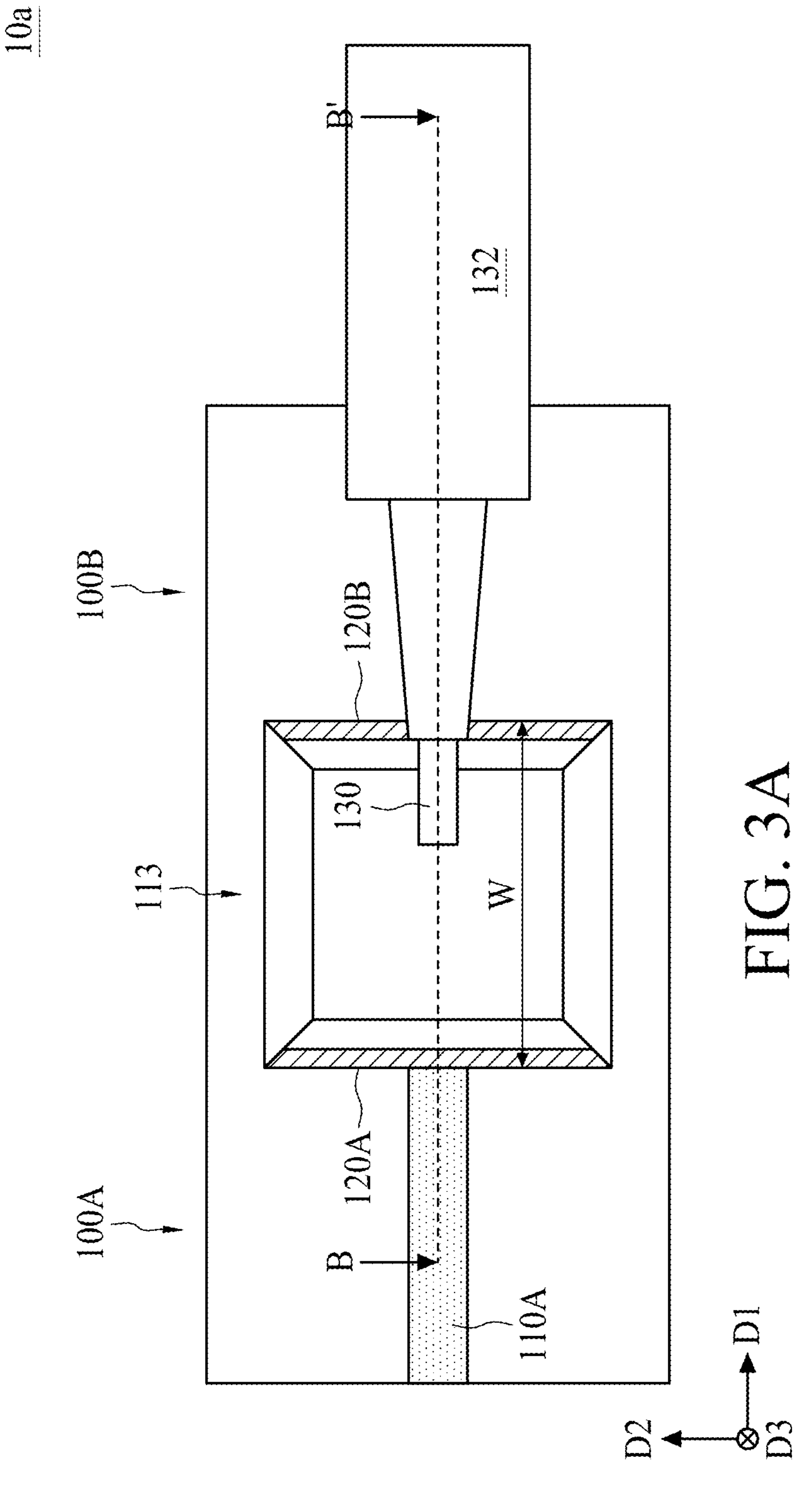
FIGS. 3A and 3C are partial top views of a semiconductor structure according to the present disclosure in one or more embodiments.

Referring to FIGS. 2B and 3A, the reflective layer 120A has a side surface 124A exposed through and parallel to the sidewall of the trench 113, and the reflective layer 120B has a side surface 124B exposed through and parallel to the sidewall of the trench 113. Further, a length L of the reflective layers 120A and 120B is measured along the side surfaces 124A and 124B in the third direction D3. In some embodiments, the length L is between approximately 0.1 micrometer and 100 micrometers, but the disclosure is not limited thereto. In some embodiments, a thickness of each of the reflective layers 120A and 120B is between approximately 1 nanometer and approximately 50 micrometers, but the disclosure is not limited thereto.

Figure 5A:
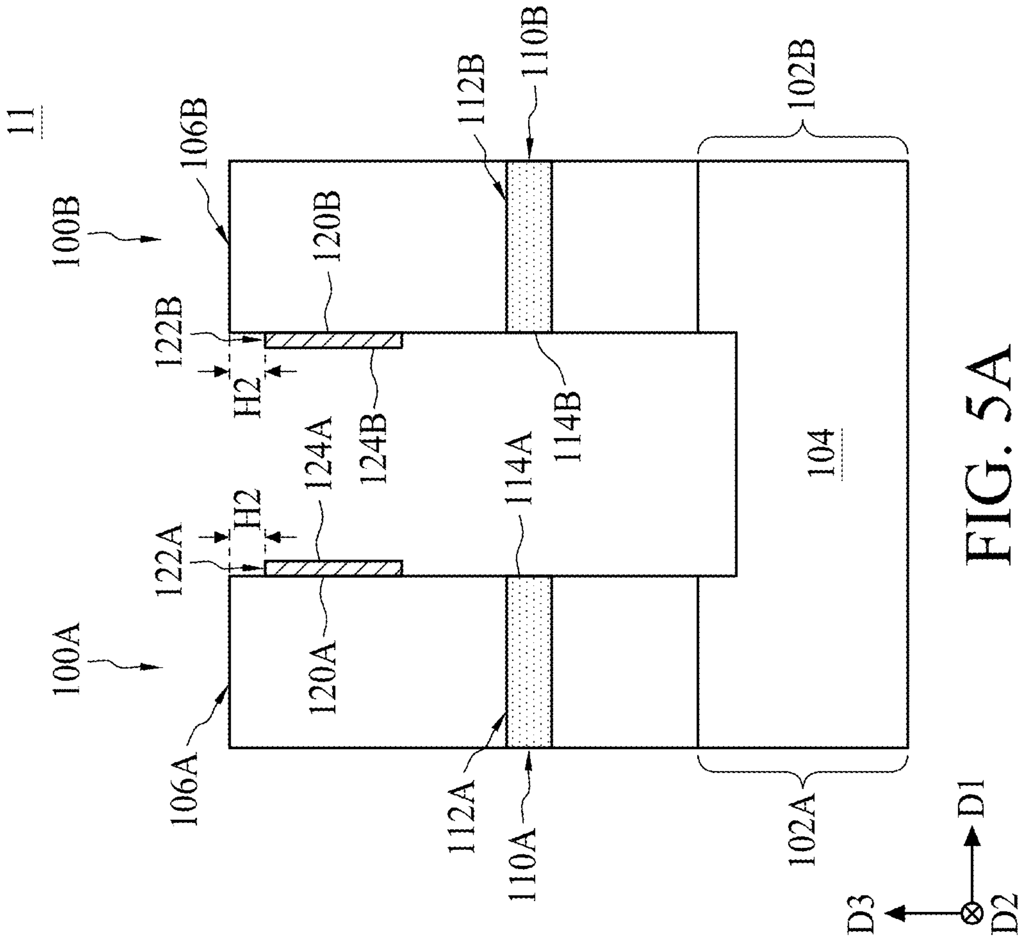
FIG. 5A is a cross-sectional view of a semiconductor structure according to the present disclosure in one or more embodiments.

In some embodiments, the side surface 124A of the reflective layer 120A is parallel to a side surface 114A of the edge coupler 110A, and the side surface 124B of the reflective layer 120B is parallel to a side surface 114B of the edge coupler 110B, as shown in FIGS. 2B and 5A, but the disclosure is not limited thereto.

Figure 4:
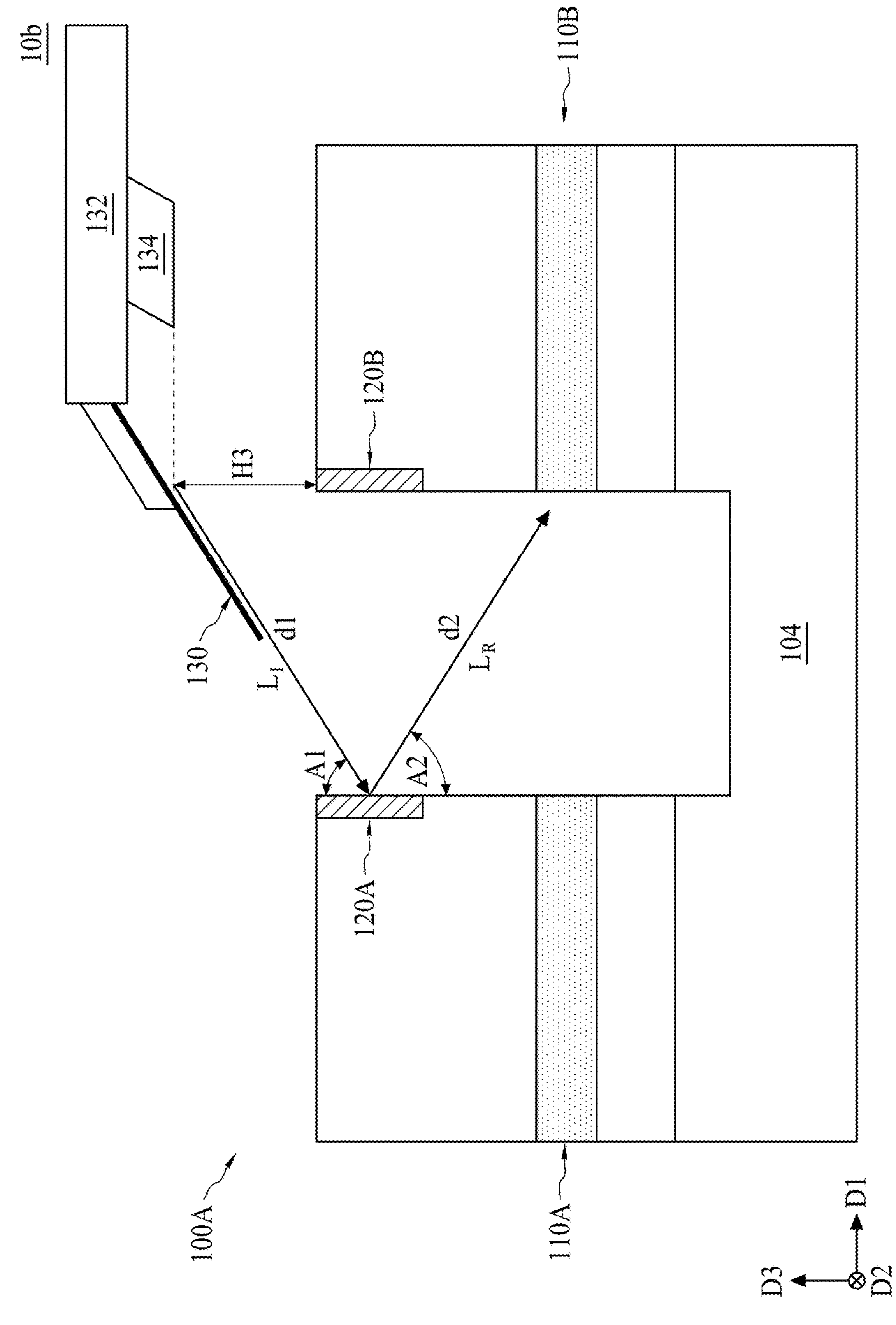
FIG. 4 is a cross-sectional view according to the present disclosure in one or more embodiments.

Referring to FIG. 4, in some embodiments, the reflective layer 120A may be embedded in the optical die 100A, and the reflective layer 120B may be embedded in the optical die 100B. For example, in the semiconductor structure 10*b*, the side surface 124A of the reflective layer 120A is level with the side surface 114A of the edge coupler 110A, and the side surface 124B of the reflective layer 120B is level with the side surface 114B of the edge coupler 110B.

It some comparative embodiments, a wafer-level measurement or a wafer-level test may be performed on the semiconductor structures 10*a*, 10*b* and 11. In such comparative embodiments, an optical fiber is plugged into the trench 113 such that an optical signal may be introduced to the edge couplers 110A and 110B. However, because the top surfaces 112A and 112B of the edge couplers 110A and 110B are separated from the top surfaces 106A and 106B of the optical dies 100A and 100B, the optical fiber has to be plugged into the trench 113 at some tilt angles. Further, a fiber holder is applied to provide the tilt angles. Even under such condition, an undesired collision between the optical fiber and the optical dies 100A and 100B, or between the fiber holder and the optical dies 100A and 100B, may occur.

Figure 3B:
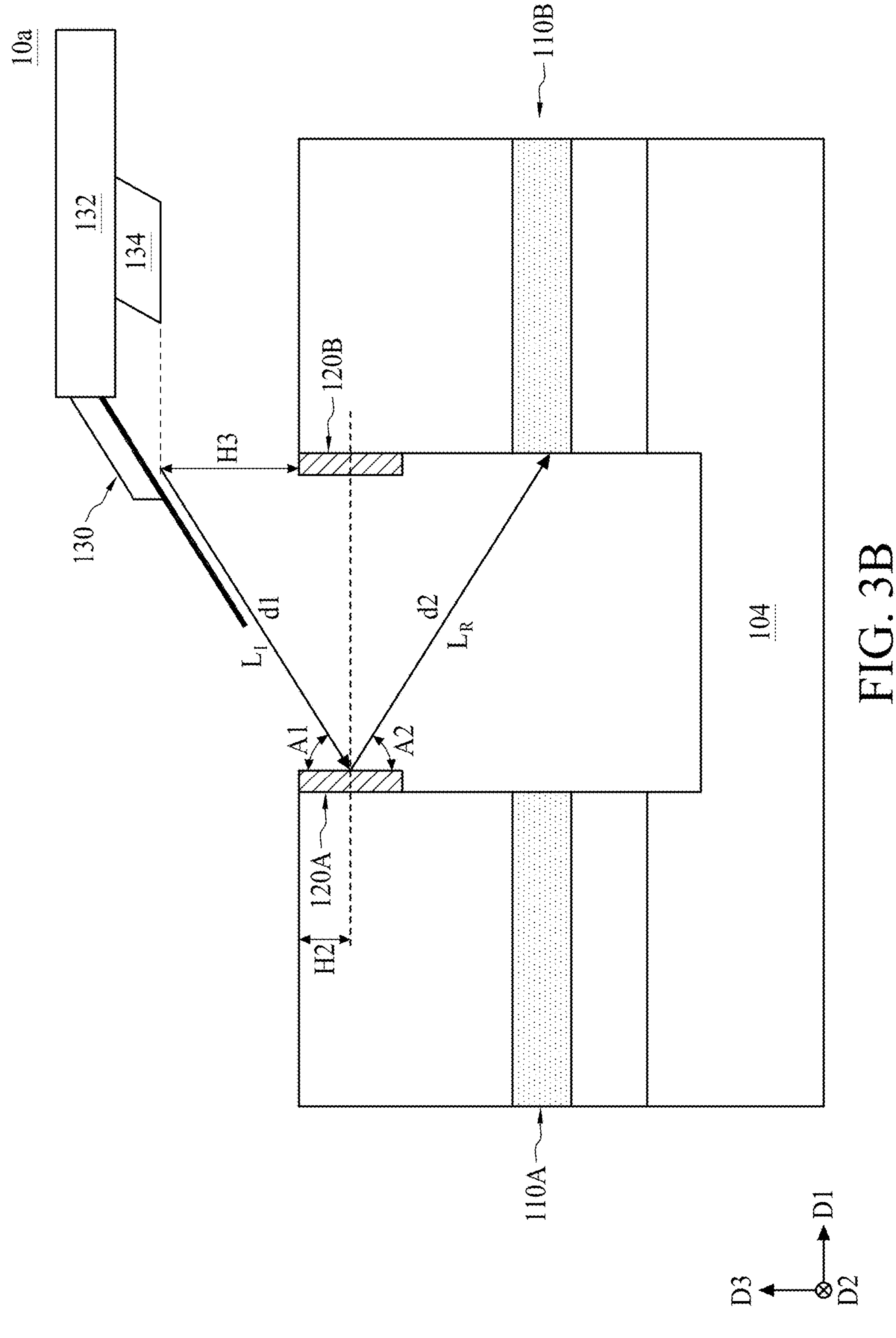
FIG. 3B is a cross-sectional view taken along a line B-B' of FIG. 3A.
Figure 5B:
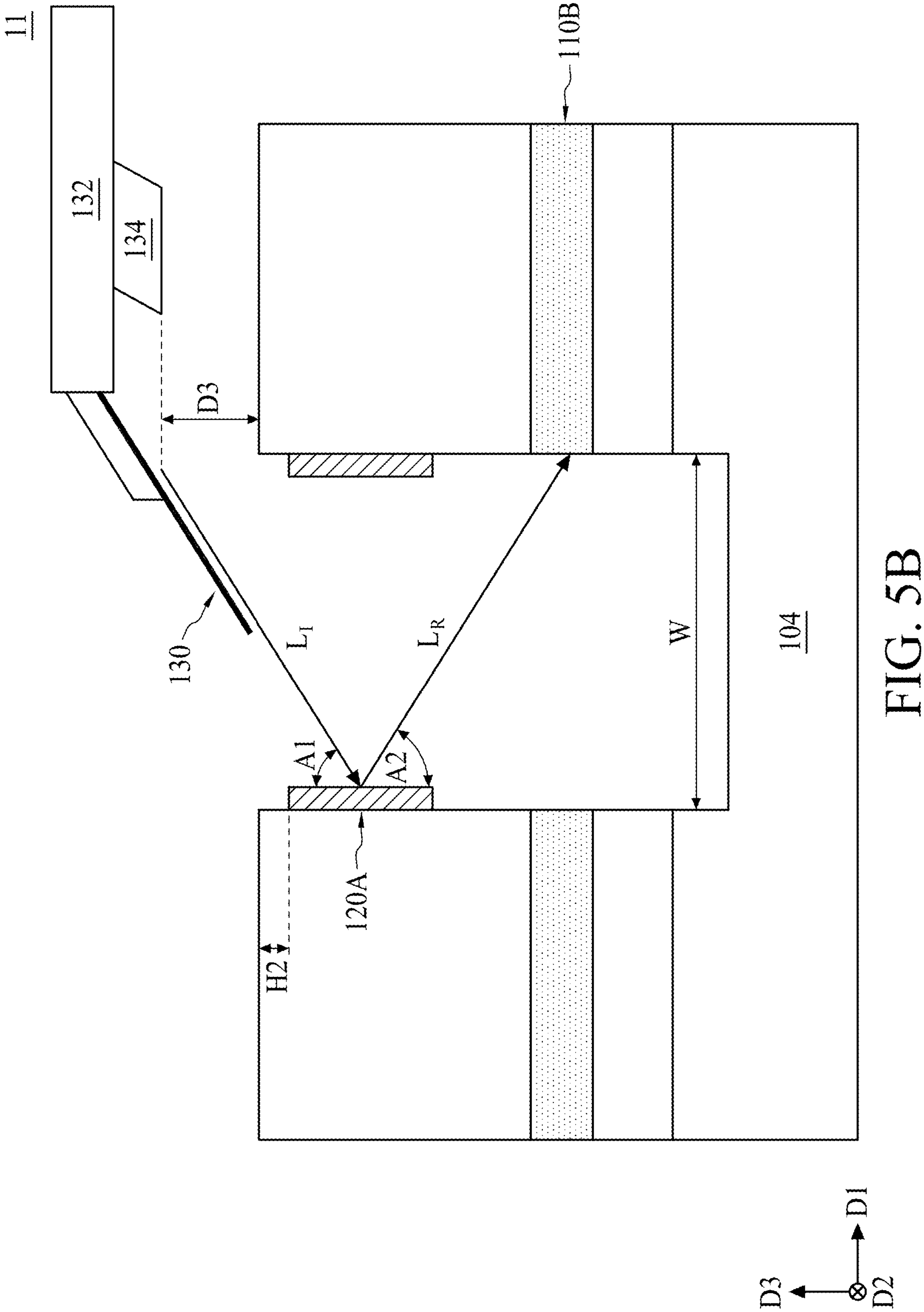
FIG. 5B is a cross-sectional view of the semiconductor structure in a stage subsequent to that of FIG. 5A.

Referring to FIGS. 3A, 3B, 4 and 5B in contrast to the comparative approaches, in a wafer-level measurement or a wafer-level test in accordance with the present disclosure, an optical fiber 130 is separated from the trench 113. For example, the optical fiber or fiber array 130, which is held by a fiber holder 132, may approach the trench 113 and may be held over the optical die 100B, but a distance H3 is kept between the optical fiber 130 and the top surface 106B of the optical die 100B. In some embodiments, a sensor 134 may be adopted on a bottom of the fiber holder 132 in order measure the distance H3 between the optical fiber 130 and the top surface 106B of the optical die 100B. In some embodiments, an incident light $L_I$ is introduced to the reflective layer 120A from the optical fiber 130, and the incident light $L_I$ is reflected by the reflective layer 120A to form a reflected light $L_R$. As shown in FIGS. 3B, 4 and 5B, in some embodiments, an angle A1 formed between the side surface 124A of the reflective layer 120A and the incident light $L_I$ may be between approximately 1° and approximately 89°. An angle A2 formed between the side surface 124A of the reflective layer 120A and the reflected light $L_R$ may be between approximately 1° and approximately 89°. It should be understood that the angle A1 and the angle A2 are equal. In such embodiments, the reflected light $L_R$ reaches the edge coupler 110B and is introduced into the optical die 100B through the edge coupler 110B. In such embodiments, a measured signal or a test result is obtained in the optical die 100B.

Figure 3C:
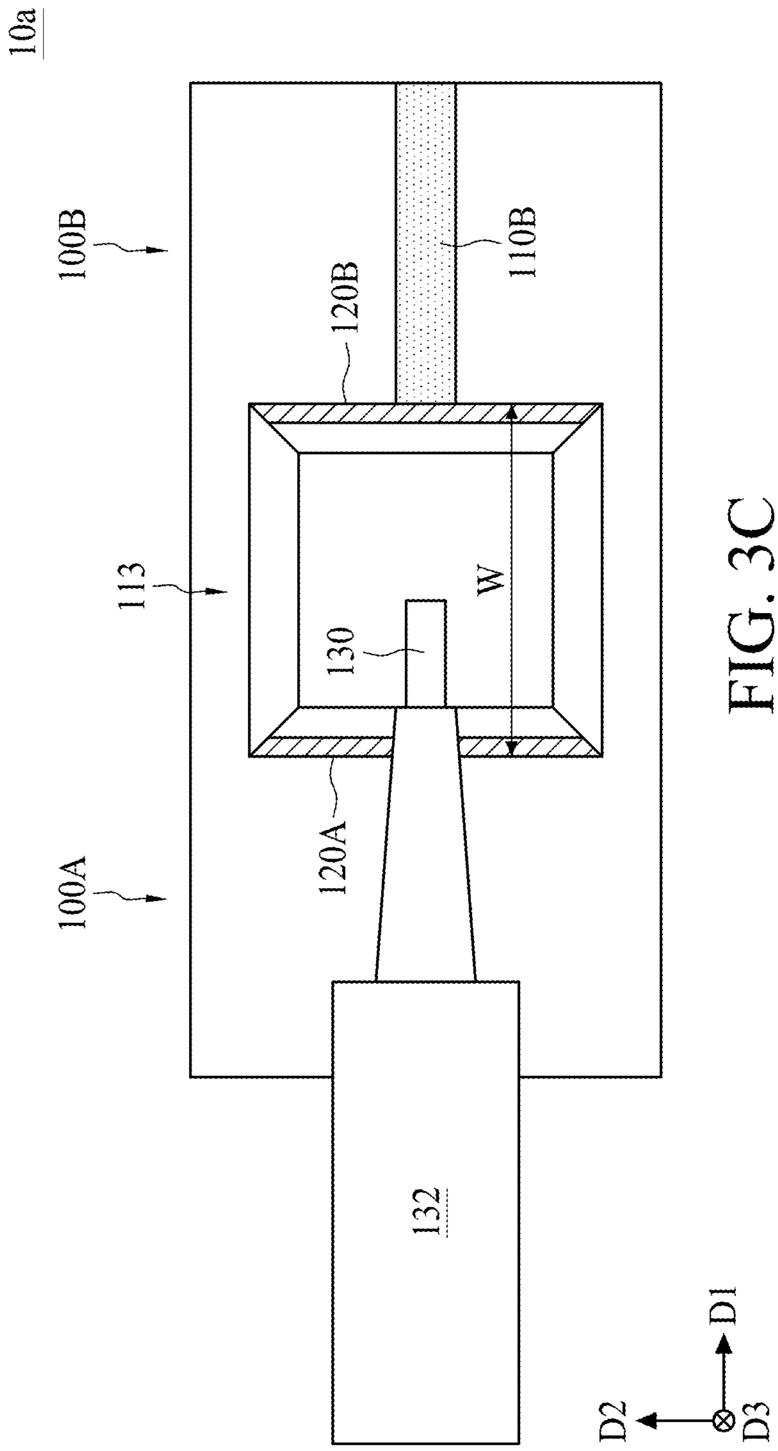

Referring to FIG. 3C, in some embodiments, after performing the wafer-level measurement or the wafer-level test on the edge coupler 110B of the optical die 100B, a same measurement or test may be performed on the edge coupler 110A of the optical die 100A. In such embodiments, the fiber holder 132 may approach the trench 113 and may be held over the optical die 100A, but the distance H3 is kept between the optical fiber 130 and the top surface 106A of the optical die 100A. An incident light $L_I$ is introduced to the reflective layer 120B from the optical fiber 130, and the incident light $L_I$ is reflected by the reflective layer 120B to form a reflected light $L_R$. In such embodiments, the reflected light $L_R$ reaches the edge coupler 110A and is introduced into the optical die 100A through the edge coupler 110A. In such embodiments, a measured signal or a test result is obtained in the optical die 100A. It should be understood that such mechanism is similar to that shown in FIG. 3B; therefore, a repeated drawing is omitted for brevity.

Figure 6:
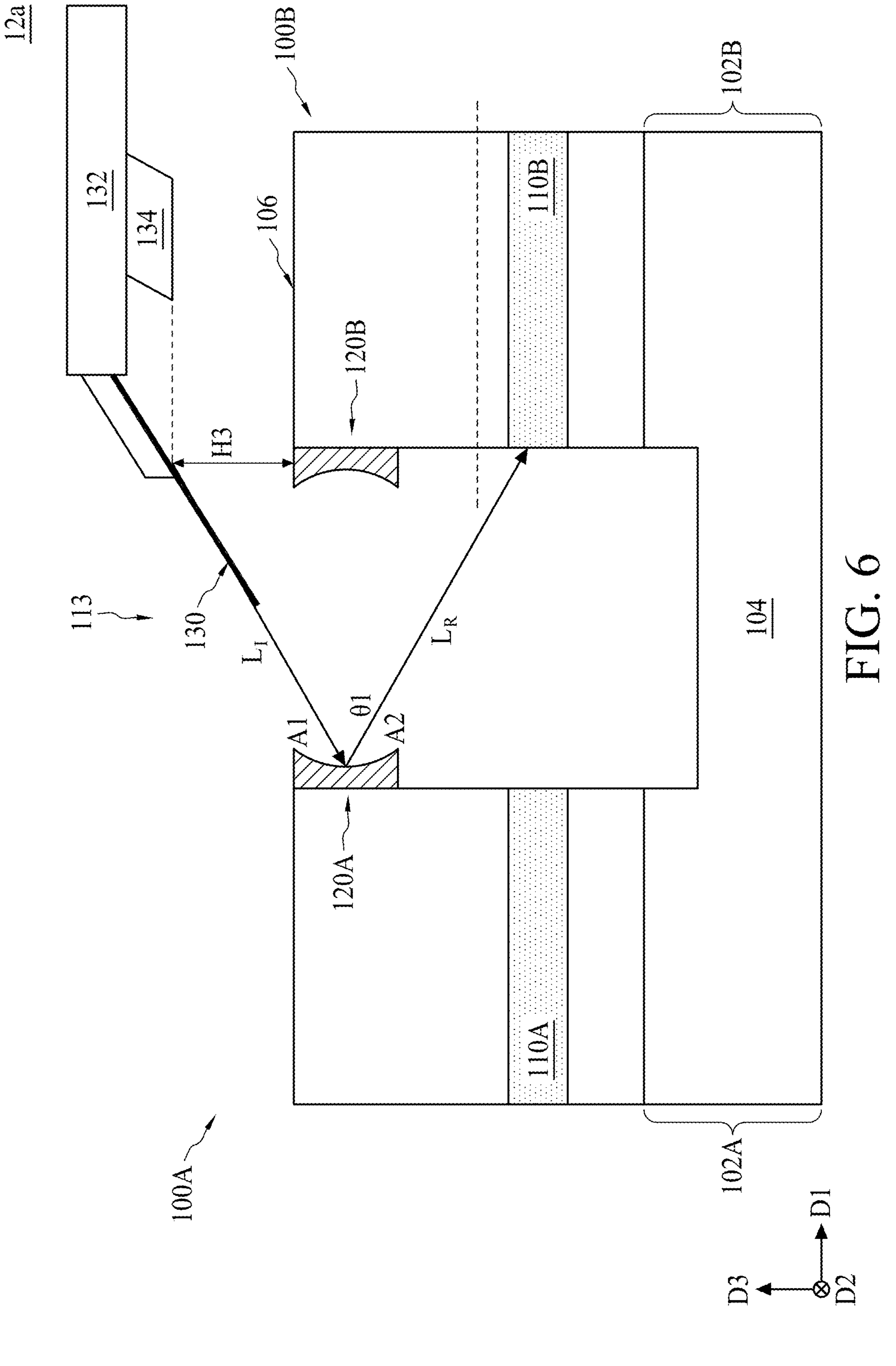
FIGS. 6-17 are cross-sectional views of semiconductor structures according to the present disclosure in one or more embodiments.
Figure 7:
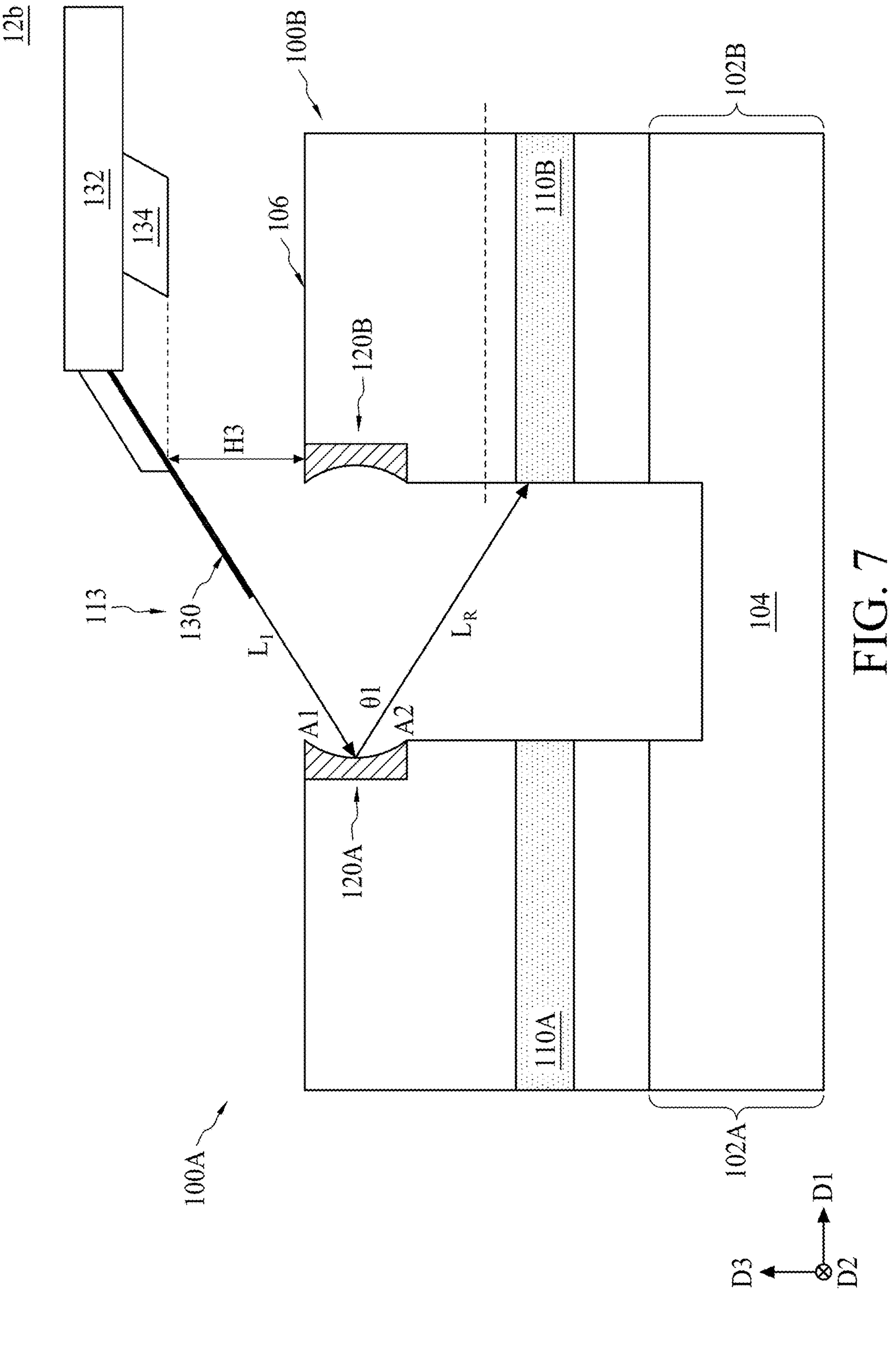

In some embodiments, the reflective layers 120A and 120B can have various configurations in order to improve the reflections of the optical signals. Referring to FIGS. 6 and 7, in some embodiments, each of the reflective layers 120A and 120B may have a concave surface. In some embodiments, a radius of a curvature of the concave surfaces of the reflective layers 120A and 120B may be greater than approximately 1 micrometer. In some embodiments, the radius may be between from approximately 1 micrometer and infinity.

Still referring to FIGS. 6 and 7, a wafer-level measurement or a wafer-level test can be performed on the semiconductor structures 12*a* and 12*b*. For example, the wafer-level test is performed on the edge coupler 110A of the optical die 100A and the edge coupler 110B of the optical die 100B, respectively. For example, the optical fiber 130, which is held by the fiber holder 132, may approach the trench 113 and may be held over the optical die 100B, but the distance H3 is kept between the optical fiber 130 and the top surface 106B of the second optical die 100B. In some embodiments, an incident light $L_I$ is introduced to the reflective layer 120A from the optical fiber 130, and the incident light $L_I$ is reflected by the reflective layer 120A to form a reflected light $L_R$. As shown in FIGS. 6 and 7, in some embodiments, an included angle θ1 is formed between the incident light $L_I$ and the reflected light $L_R$, and the included angle θ1 may be between approximately 2° and approximately 178°. In such embodiments, the reflected light $L_R$ reaches the edge coupler 110B and is introduced into the optical die 100B through the edge coupler 110B. In such embodiments, a measured signal or a test result is obtained in the optical die 100B. As mentioned above, the same measurement or test may be performed on the edge coupler 110A; therefore, details thereof are omitted for brevity.

Figure 8:
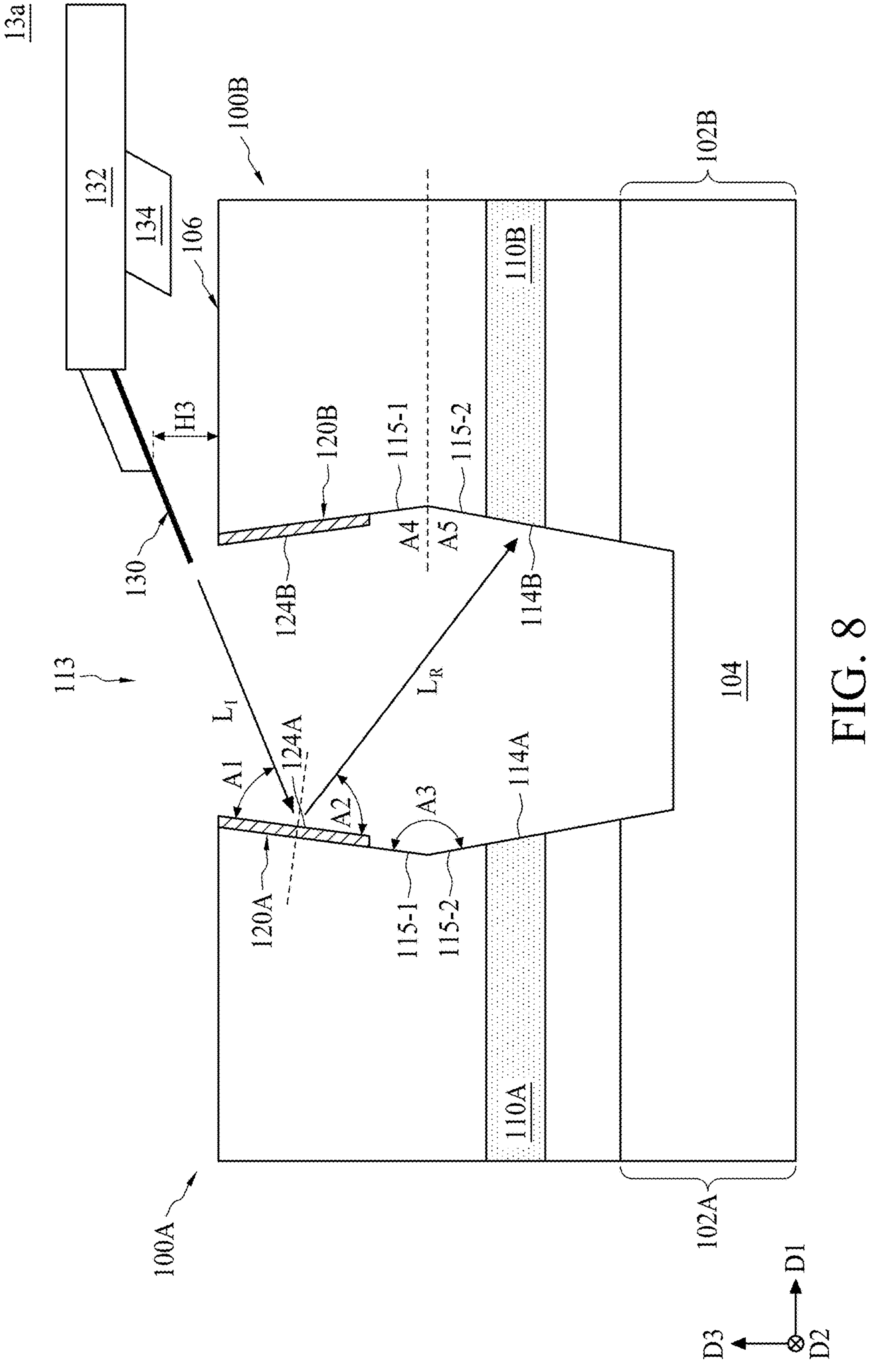
Figure 9:
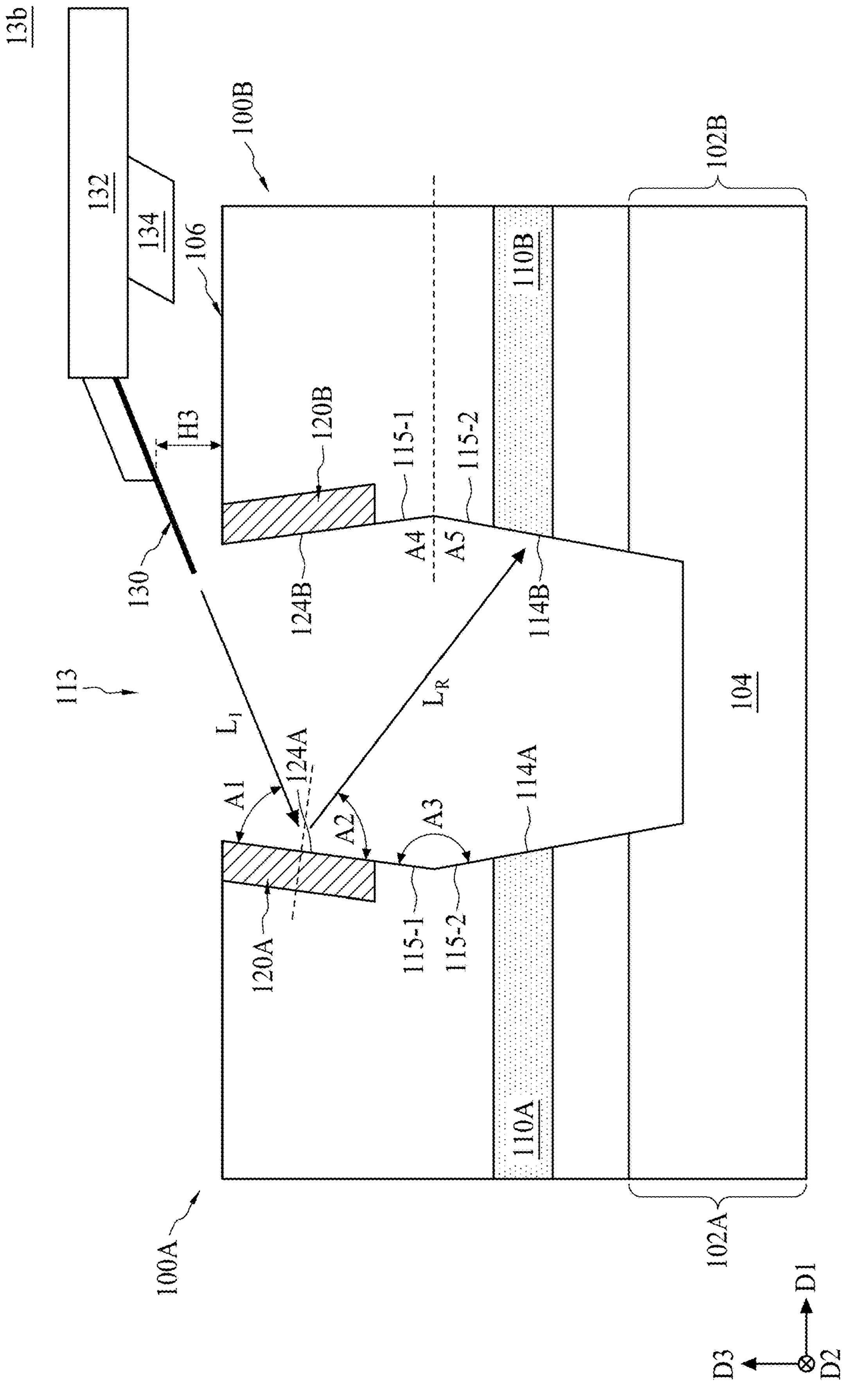

In some embodiments, the trench 113 can have various configurations in order to improve the reflections of the optical signals. Referring to FIGS. 8 and 9, in some embodiments, the trench 113 may have a configuration different from that shown in FIGS. 1 to 7. For example, sidewalls of the trench 113, which are referred to as the edge of the optical die 100A and the edge of the optical die 100B, may have two portions. In some embodiments, the sidewall of the trench 113 has a first portion 115-1 and a second portion 115-2. The second portion 115-2 couples to the first portion 115-1 and the bottom of the trench 113. An included angle A3 is formed by the first portion 115-1 and the second portion 115-1 of the sidewall of the trench 113. In some embodiments, the included angle A3 is between approximately 2° and approximately 178°.

Referring to FIGS. 8 and 9, in some embodiments, the first portion 115-1 of the sidewall of the trench 113 and a horizontal line (as a dotted line shown in FIGS. 8 and 9), which is parallel to the bottom of the trench 113, form an included angle A4, and the included angle A4 is between approximately 1° and approximately 89°. In some embodiments, the second portion 115-2 of the sidewall of the trench 113 and the horizontal line form an included angle A5, and the included angle A5 is between approximately 1° and approximately 89°. In some embodiments, the included angle A4 and the included angle A5 are equal. In some alternative embodiments, the included angle A4 and the included angle A5 are different from each other.

Still referring to FIGS. 8 and 9, the reflective layers 120A and 120B are disposed over the first portion 115-1 of the sidewall of the trench 113; therefore, the reflective layers 120 and 120B are tilted with the first portion 115-1 of the sidewall of the trench 113. In such embodiments, the side surface 114A of the edge coupler 110A and the side surface 114B of the edge coupler 110B are exposed through the second portion 115-2 of the sidewall of the trench 113, therefore, the side surfaces 114A and 114B of the edge couplers 110A and 110B are tilted with the second portion 115-2 of the sidewall of the trench 113. Accordingly, the side surface 114A of the edge coupler 110A and the side surface 124A of the reflective layer 120A form an included angle, and the included angle is an obtuse angle. The side surface 114B of the edge coupler 110B and the side surface 124B of the reflective layer 120B form an included angle, and the included angle is an obtuse angle.

Referring to FIG. 8, in some embodiments, the reflective layer 120A may be embedded in the optical die 100A, and the reflective layer 120B may be embedded in the optical die 100B. For example, in the semiconductor structure 10*b*, the side surface 124A of the reflective layer 120A and the side surface 124B of the reflective layer 120B are is level with the first portions 115-1 of the sidewall of the trench 113.

A wafer-level measurement or a wafer-level test can be performed on the semiconductor structures 13*a* and 13*b*. For example, the wafer-level test is performed on the edge coupler 110A of the optical die 100A and the edge coupler 110B of the optical die 100B, respectively. In some embodiments, the optical fiber 130, which is held by the fiber holder 132 may approach the trench 113 and may be held over the optical die 100B, but the distance H3 is kept between the optical fiber 130 and the top surface 106B of the optical die 100B. In some embodiments, the incident light $L_I$ is introduced to the reflective layer 120A from the optical fiber 130, and the incident light $L_I$ is reflected by the reflective layer 120A to form the reflected light $L_R$. As shown in FIGS. 8 and 9, in some embodiments, the angle A1 formed between the side surface 124A of the reflective layer 120A and the incident light $L_I$ may be between approximately 1° and approximately 89°. The angle A2 is formed between the side surface 124A of the reflective layer 120A and the reflected light $L_R$, and the angle A2 may be between approximately 1° and approximately 89°. It should be understood that the angle A1 and the angle A2 are equal. In such embodiments, the reflected light $L_R$ reaches the edge coupler 110B and is introduced into the optical die 100B through the edge coupler 110B. In such embodiments, a measured signal or a test result is obtained in the optical die 100B. As mentioned above, the same measurement or test may be performed on the edge coupler 110A; therefore, details thereof are omitted for brevity.

Figure 10:
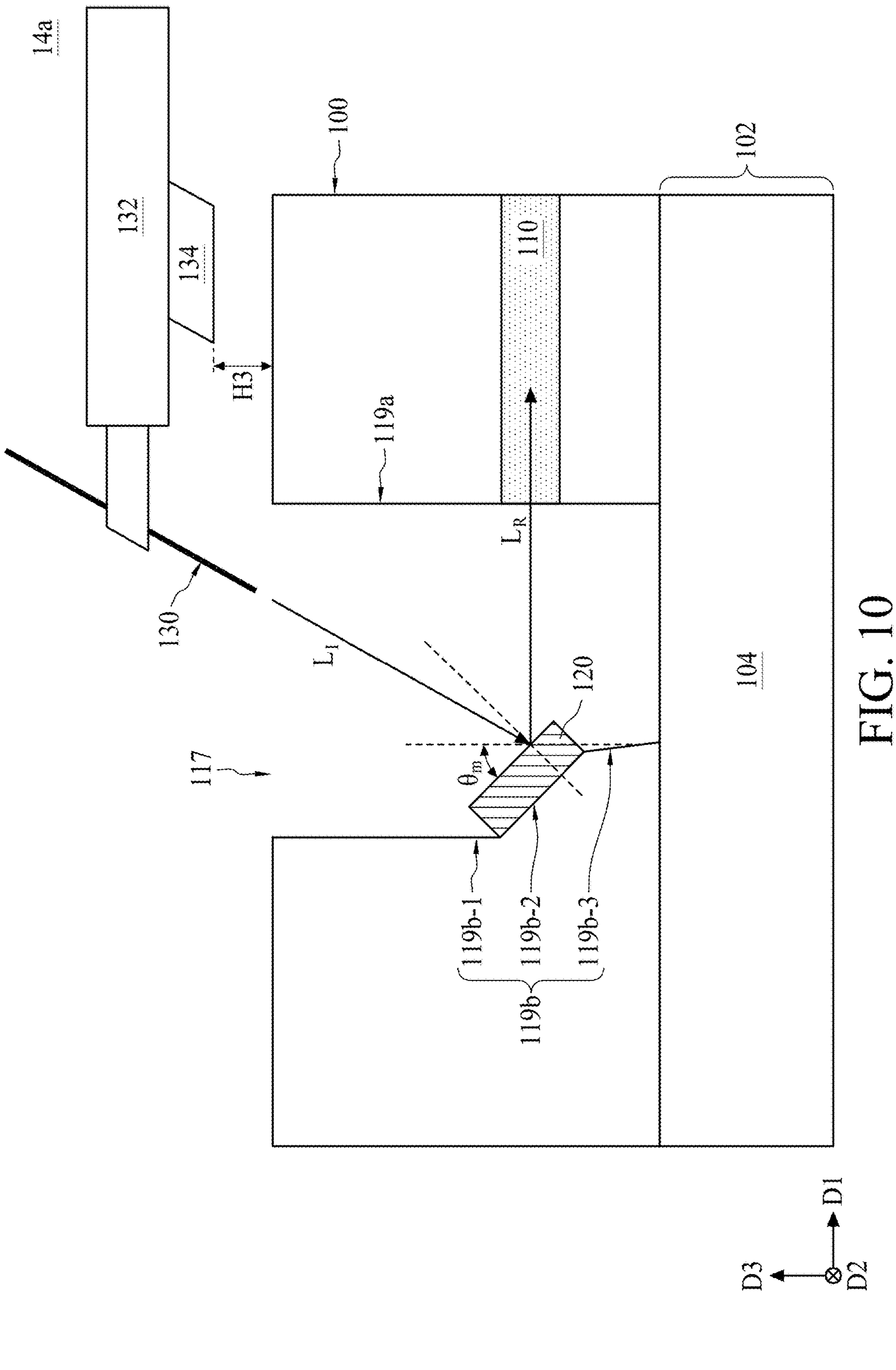
Figure 11:
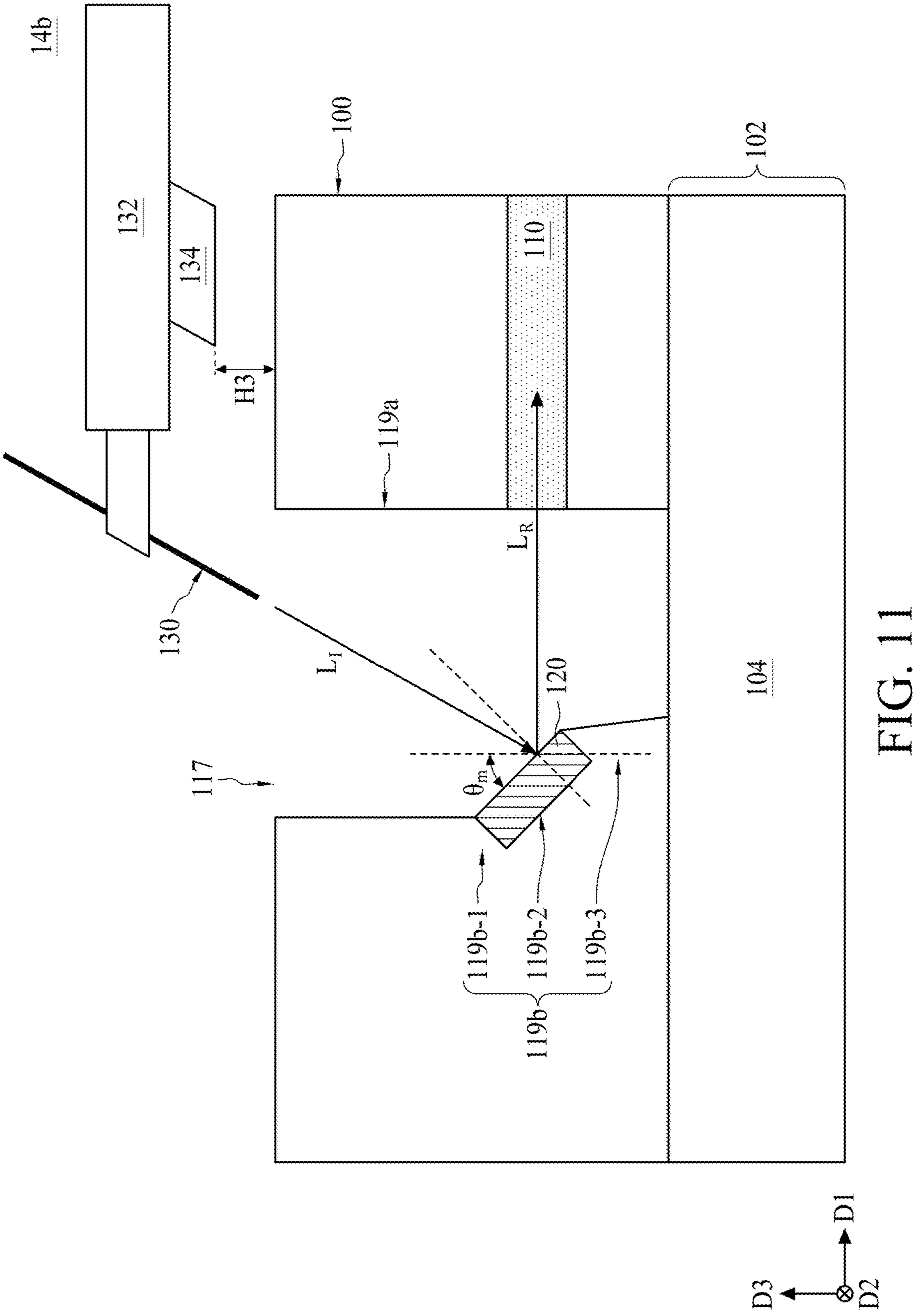

In the abovementioned embodiments, the trench 113 may have a symmetric configuration, and the reflective layers 120A and 120B are disposed symmetrically. However, in other embodiments, the trench 113 may have an asymmetric configuration to improve the reflection. Referring to FIGS. 10 and 11, in some embodiments, semiconductor structures 14 and 14*b* including an optical die 100 and an edge coupler 110 are provided. The edge coupler 110 is exposed though an asymmetric trench 117. In some embodiments, the edge coupler 110 may be referred to as adjacent to and exposed through an edge of the optical die 100. As shown in FIGS. 10 and 11, the asymmetric trench 117 may have a first sidewall 119*a* and a second sidewall 119*b* opposite to each other. The first sidewall 119*a* may be a substantially straight sidewall, and the edge coupler 110 is exposed though the straight first sidewall 119*a*. The second sidewall 119*b* may be a winding sidewall. In some embodiments, the winding second sidewall 119*b* may include at least three portions 119*b*-1, 119*b*-2 and 119*b*-3, with the portion 119*b*-2 coupling the portion 119*b*-1 to the portion 119*b*-3. Further, the portion 119*b*-2 is referred to as a light-receiving portion. In such embodiment, a reflective layer 120 is disposed over the light-receiving portion 119*b*-2. In some embodiments, the light-receiving portion 119*b*-2 is tilted such that the reflective layer 120 and a normal line perpendicular to a bottom of the trench 117 form an angle $\theta_m$, as shown in FIGS. 10 and 11. In some embodiments, the angle $\theta_m$ is between approximately 1° and approximately 45°, but the disclosure is not limited thereto.

Referring to FIG. 11, in some embodiments, the reflective layer 120 may be embedded in the optical die 10.

A wafer-level measurement or a wafer-level test can be performed on the edge coupler 110 of the optical die 100 of the semiconductor structures 14*a* and 14*b*. For example, an optical fiber 130, which is held by a fiber holder 132, may approach the asymmetric trench 117 and may be held over the optical die 100, but the distance H3 is kept between the optical fiber 130 and a top surface 106 of the optical die 100. In some embodiments, an incident light $L_I$ is introduced to the reflective layer 120 from the optical fiber 130, and the incident light $L_I$ is reflected by the reflective layer 120 to form a reflected light $L_R$. As shown in FIGS. 10 and 11, the reflected light $L_R$ reaches the edge coupler 110 and is introduced into the optical die 100 through the edge coupler 110. In such embodiments, a measured signal or a test result is obtained in the optical die 100.

Figure 12:
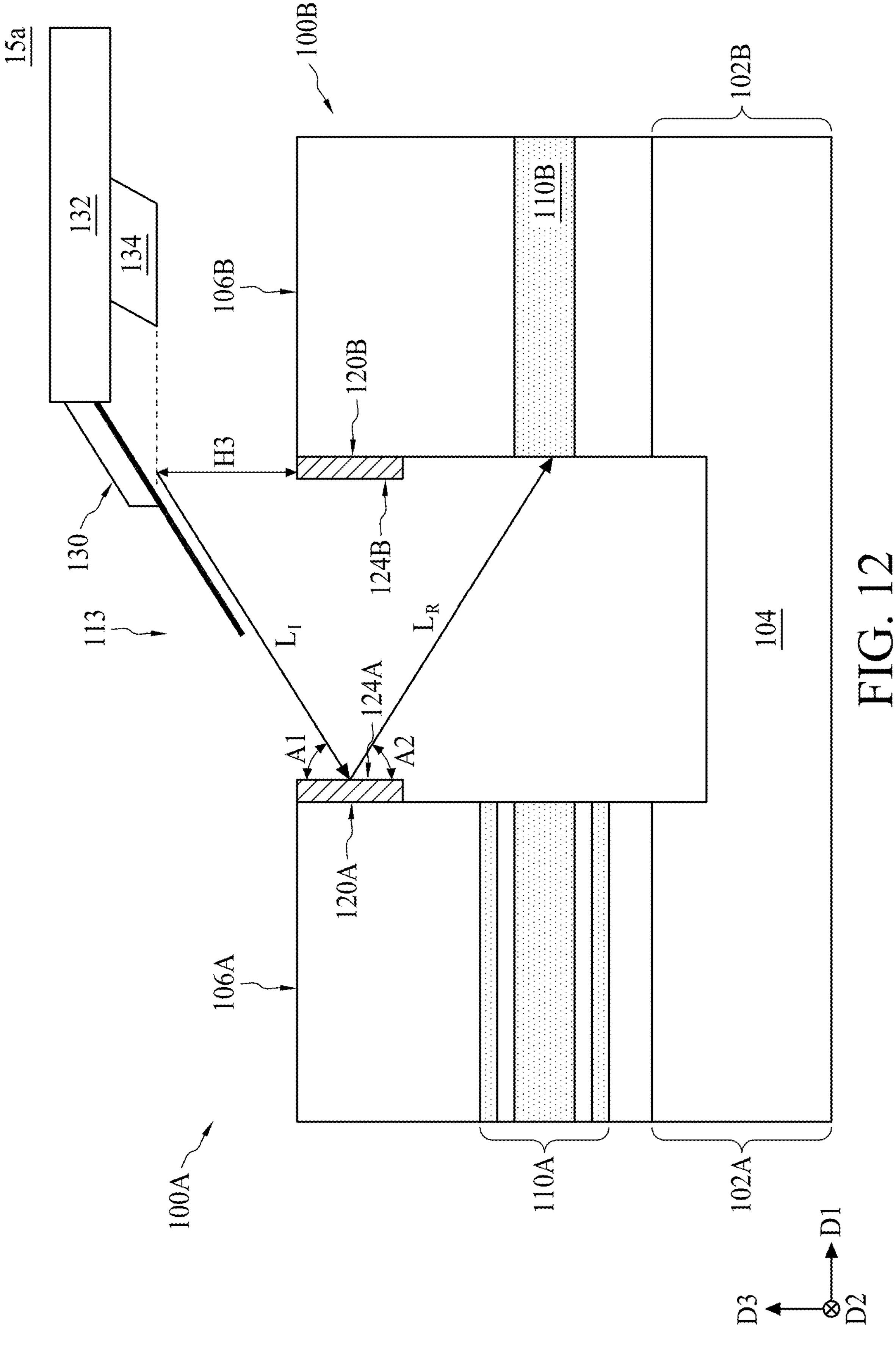
Figure 13:
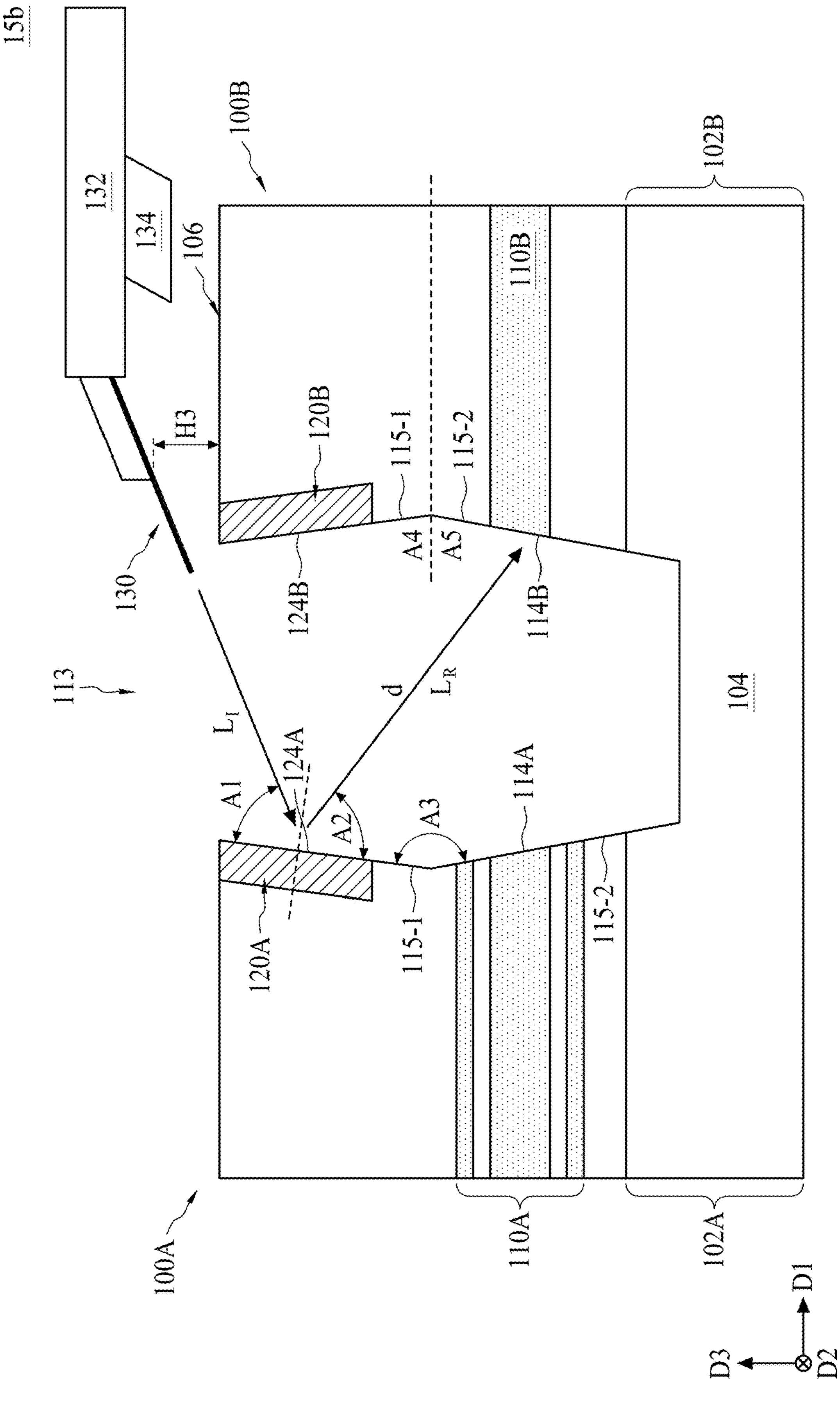
Figure 14:
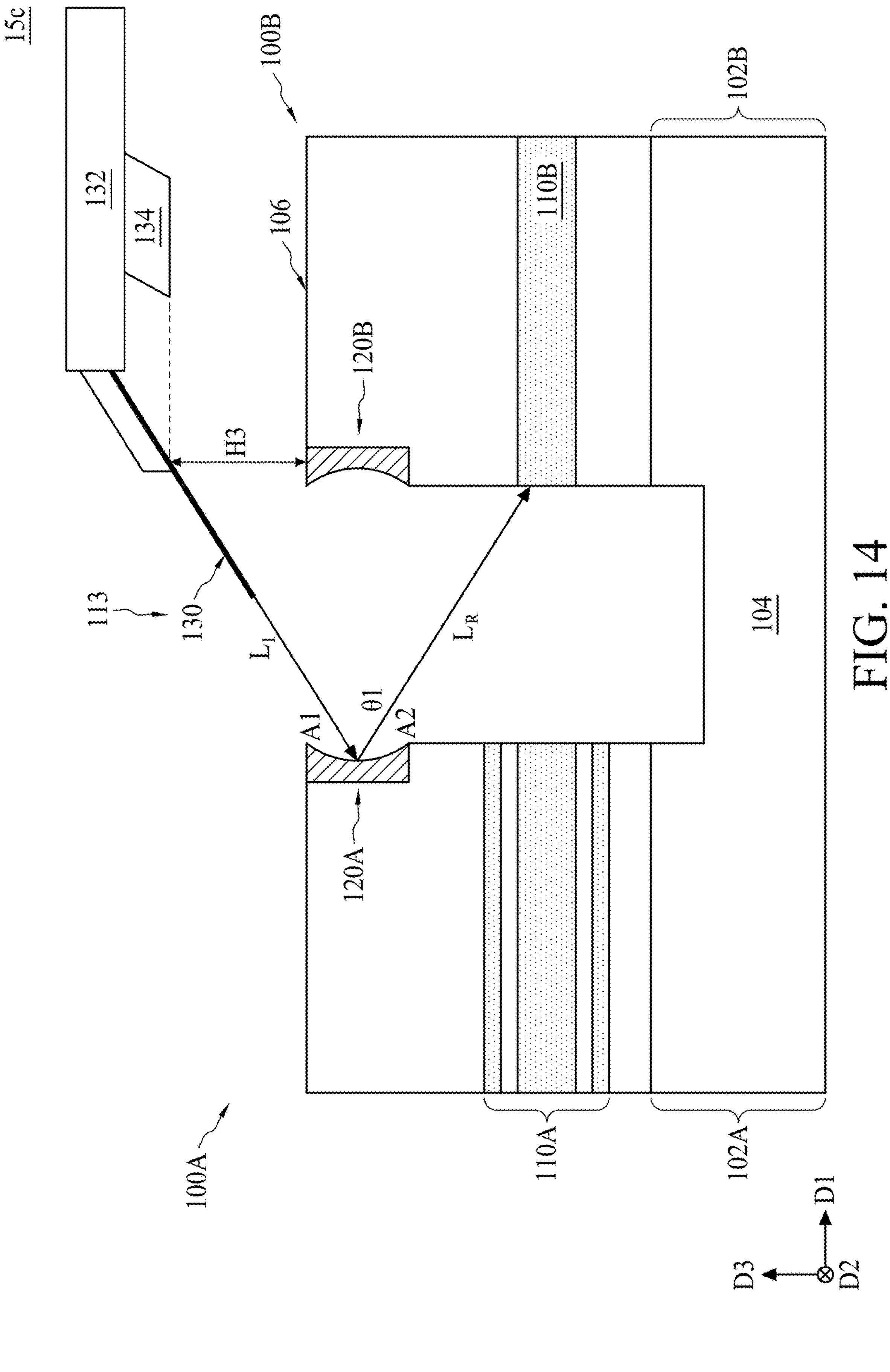

In some embodiments, the reflective layers 120A and 120B can be used to improve a wafer-level measurement or wafer-level test for various edge couplers. For example, semiconductor structures 15*a* to 15*c* that include optical dies 100A and 100B that are different from each other is provided. Referring to FIG. 12, the optical die 100A may include a multi-layered edge coupler 110A, while the optical die 100B may include a single-layered edge coupler 110B. In other words, the edge coupler 110A and the edge coupler 110B are different. The reflective layers 120A and 120B may be disposed over sidewalls of the trench 113. As mentioned above, the reflective layer 120A may be adjacent to the edge of the optical die 100A, and the reflective layer 120B may be adjacent to the edge of the optical die 100B. An arrangement of the reflective layers 120A and 120B may be similar to those mentioned above and illustrated in FIGS. 13 and 14; therefore, details thereof are omitted for brevity.

In some embodiments, a wafer-level measurement or a wafer-level test is performed on the semiconductor structures 15*a* to 15*c*. In accordance with the present disclosure, an optical fiber 130 is separated from the trench 113. For example, the optical fiber 130, which is held by a fiber holder 132, may approach the trench 113 and may be held over the optical die 100B, and a distance H3 is kept between the optical fiber 130 and a top surface 106B of the optical die 100B. In some embodiments, a sensor 134 may be adopted on a bottom of the fiber holder 132 in order measure the distance H3 between the optical fiber 130 and the top surface 160B of the optical die 100B. In some embodiments, an incident light $L_I$ is introduced to the reflective layer 120A from the optical fiber 130, and the incident light $L_I$ is reflected by the reflective layer 120A to form a reflected light $L_R$. As shown in FIG. 12, in some embodiments, an angle A1 formed between the side surface 124A of the reflective layer 120A and the incident light $L_I$ may be between approximately 1° and approximately 89°. An angle A2 is formed between the side surface 124A of the reflective layer 120A and the reflected light $L_R$, and the angle A2 may be between approximately 1° and approximately 89°. It should be understood that the angle A1 and the angle A2 are equal. In such embodiments, the reflected light $L_R$ reaches the edge coupler 110B and is introduced into the optical die 100B through the edge coupler 110B. In such embodiments, a measured signal or a test result is obtained in the optical die 100B.

In some embodiments, after the wafer-level measurement or the wafer-level test is perform on to the edge coupler 110B, a same measurement or test may be performed on the edge coupler 110A. In such embodiments, the fiber holder 132 may approach the trench 113 and may be held over the optical die 100A, and a distance is kept between the optical fiber 130 and the top surface 106A of the first optical die 100A. In such embodiments, the distance between the top surface 106A of the optical die 100A and the optical fiber 130 may be different from the distance H3, but the disclosure is not limited thereto. An incident light $L_I$ is introduced to the reflective layer 120B from the optical fiber 130, and the incident light $L_I$ is reflected by the reflective layer 120B to form a reflected light $L_R$. In such embodiments, the reflected light $L_R$ reaches the edge coupler 110A and is introduced into the optical die 100A through the edge coupler 110A. In such embodiments, a measured signal or a test result is obtained in the optical die 100A. It should be understood that such mechanism is similar to the configuration over the reflective layer 120A; therefore, repeated drawing is omitted for brevity.

Figure 15:
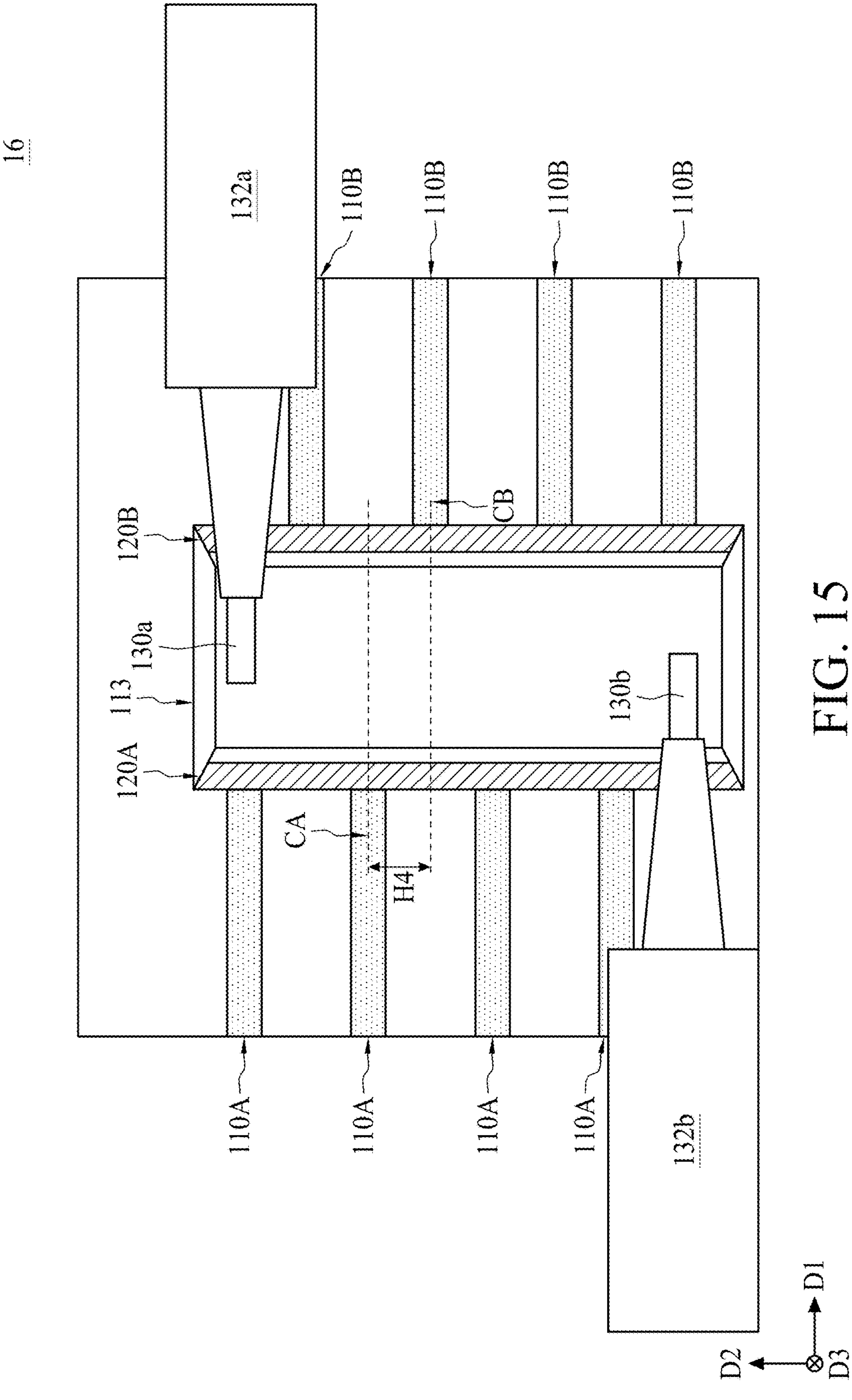

Referring to FIG. 15, in some embodiments, a semiconductor structure 16 including a plurality of edge couplers 110A and a plurality of edge couplers 110B is provided. The edge couplers 110A may belong to one optical die. In other embodiments, the edge couplers 110A may belong more than one optical die, depending on a product design. In some embodiments, the edge couplers 110B may belong to another one optical die. In other embodiments, the edge couplers 110B may belong more than one optical die, depending on a product design. A quantity of the edge couplers 110A may be equal to a quantity of the edge couplers 110B. However, in some alternative embodiments, the quantity of the edge couplers 110A is different from the quantity of the edge couplers 110B.

As shown in FIG. 15, the edge couplers 110A and 110B extend in the first direction D1, and are parallel to each other in the second direction D2. In some embodiments, a width of each edge coupler 110A is equal to a width of each edge coupler 110B. A distance between adjacent edge couplers 110A is equal to a distance between adjacent edge couplers 110B. Further, the semiconductor structure 16 includes a trench 113 exposing an end of each edge coupler 110A and 110B. In some embodiments, the edge couplers 110A are disposed at one side of the trench 113, and the edge couplers 110B are disposed at an opposite side of the trench 113, as shown in FIG. 15. In some embodiments, each of the edge couplers 110A may be aligned with one of the edge couplers 110B in the second direction D2. In other embodiments, the edge couplers 110A may be offset from the edge couplers 110B in the second direction D2, as shown in FIG. 15. An offset distance H4 may be measured between a central axis CA of the edge coupler 110A and a central axis CB of the edge coupler 110B, wherein the offset distance H4 is between 0 and approximately 1,000 micrometers.

Referring to FIG. 15, in some embodiments, reflective layers 120A and 120B may be disposed over sidewalls of the trench 113. The reflective layers 120A and 120B respectively extend in the second direction D2. In such embodiments, an extending direction of the reflective layers 120A and 120B may be perpendicular to an extending direction of the edge couplers 110A and 110B from a plan view. An arrangement of the reflective layers 120A and 120B may be similar to those mentioned above and shown in FIGS. 5A and 6-9; therefore, details thereof are omitted for brevity.

In some embodiments, wafer-level measurements or wafer-level tests are performed on the semiconductor structure 16. In accordance with the present disclosure, an optical fiber 130*a* is separated from the trench 113. For example, the optical fiber 130*a*, which is held by a fiber holder 132*a*, may approach the trench 113, and a vertical distance H3 is kept between the optical fiber 130*a* and an opening of the trench 113. A configuration of light introduction, light reflection and light receiving are similar to those described above; therefore, details thereof are omitted for brevity. Accordingly, measured signals or test results for the edge couplers 110B are obtained. In some embodiments, an optical fiber 130*b* held by a fiber holder 132*b* is used to perform the wafer-level measurements on the edge couplers 110A. A configuration of light introduction, light reflection and light receiving are similar to those described above; therefore, details thereof are omitted for brevity. Accordingly, measured signals or test results for the edge couplers 110A are obtained. In some embodiments, the measurements of the edge couplers 110A may be performed before or after the measurement of the edge couplers 110B. In some alternative embodiments, the measurements of the edge couplers 110A and the measurement of the edge couplers 110B are performed concurrently, as shown in FIG. 15, due to the offset arrangement.

Figure 16:
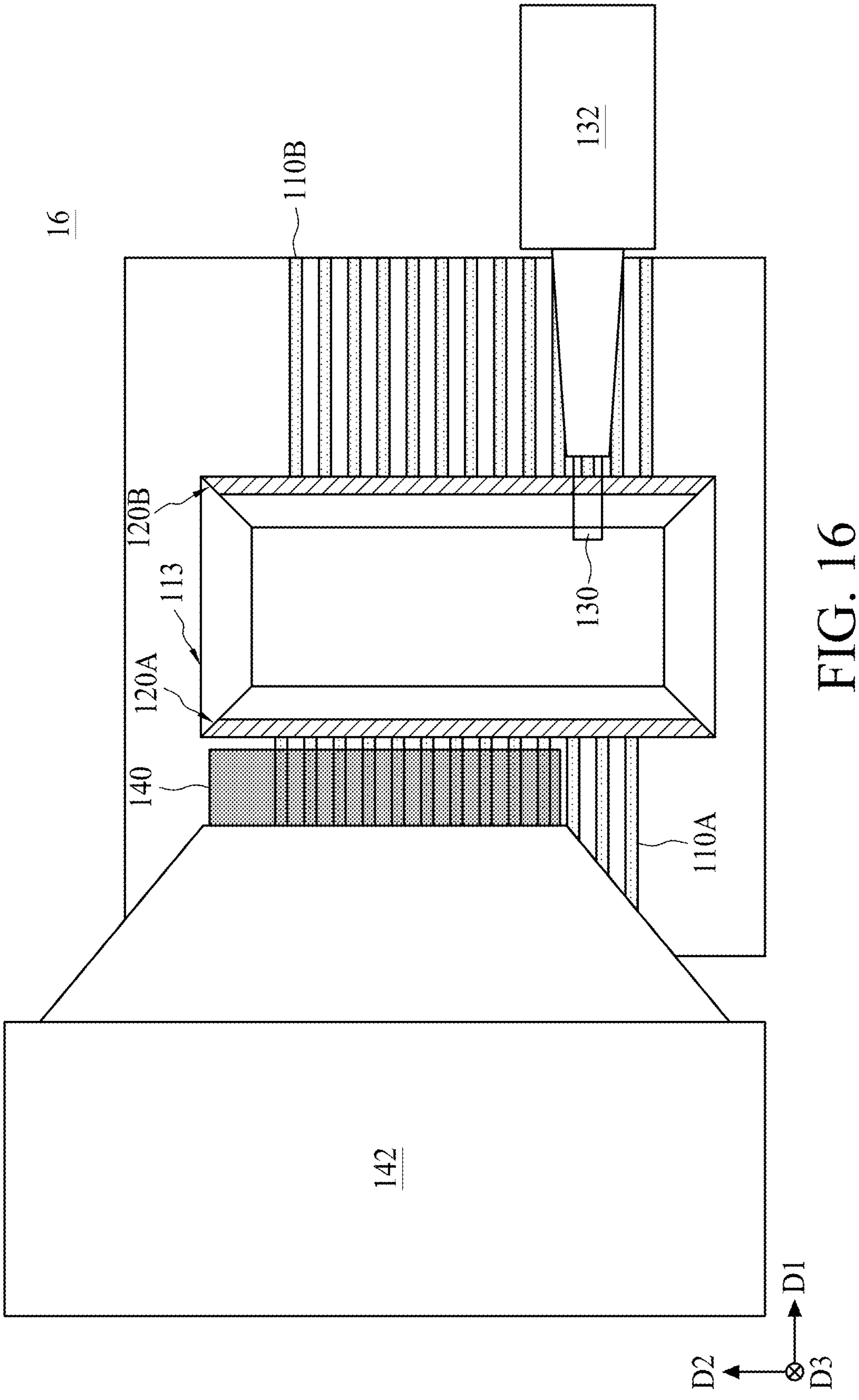

Referring to FIG. 16, in some embodiments, optical fibers can be disposed to form a fiber array 140 held by an array holder 142. In such embodiments, measurements may be performed on edge couplers 110B by the fiber array 140 while measurements of edge couplers 110A may be performed by an optical fiber 130. In alternative embodiments, the measurements of the edge couplers 110A may be performed by the fiber array 140 while measurements of the edge couplers 110B are performed by the optical fiber 130, such that efficiency is further improved. In some embodiments, both of the measurements of the edge couplers 110A and 110B can be performed by the fiber array 140, though not shown.

Figure 17:
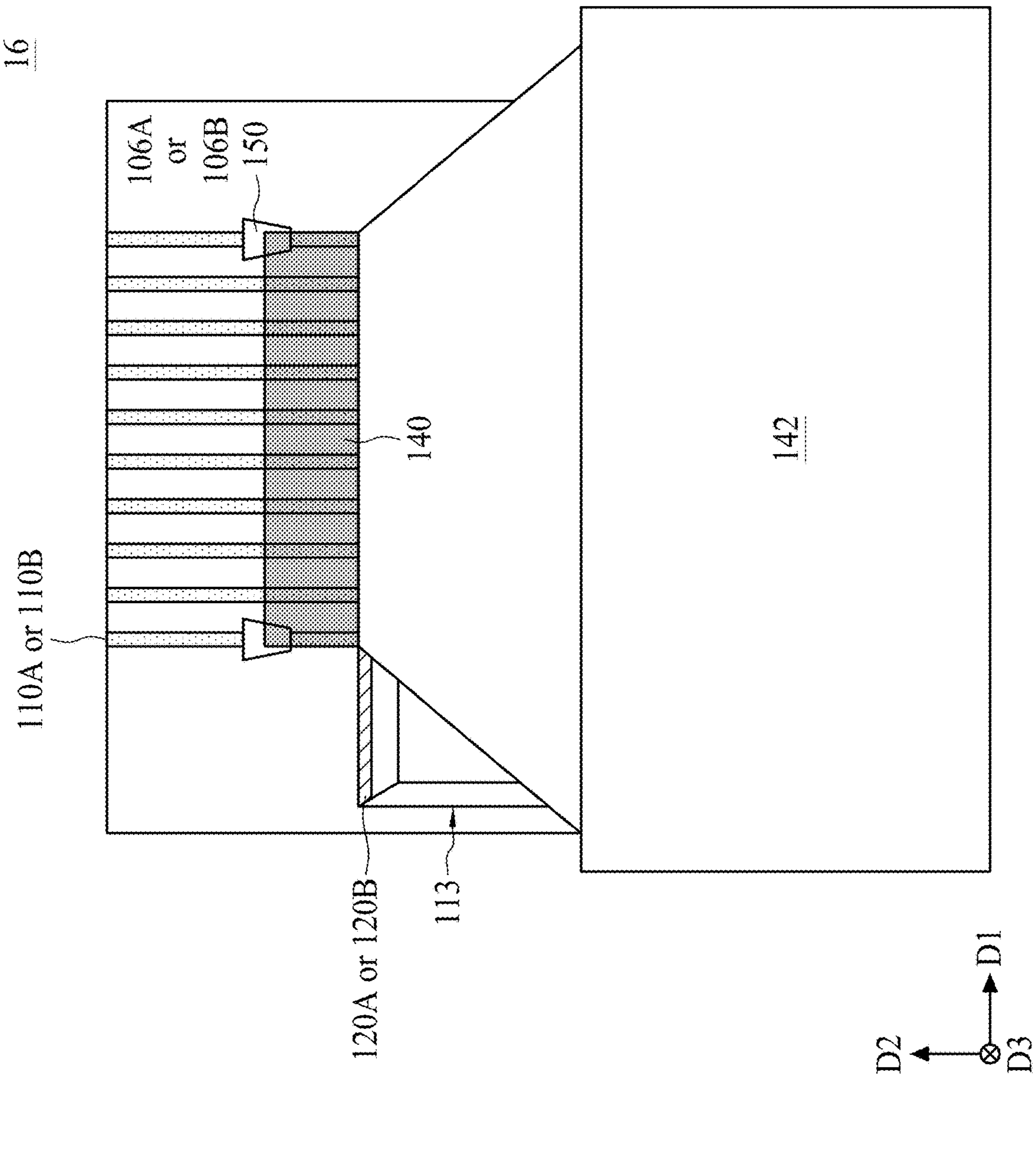

Referring to FIG. 17, in some embodiments, to further improve measurement efficiency or test efficiency, at least an alignment mark 150 may be disposed over a top surface 106A or 106B. Accordingly, the optical fiber 130 or the fiber array 140 may be aligned with the alignment mark 150, thereby accurately introducing light to reflective layers 120A or 120B.

Figure 18:
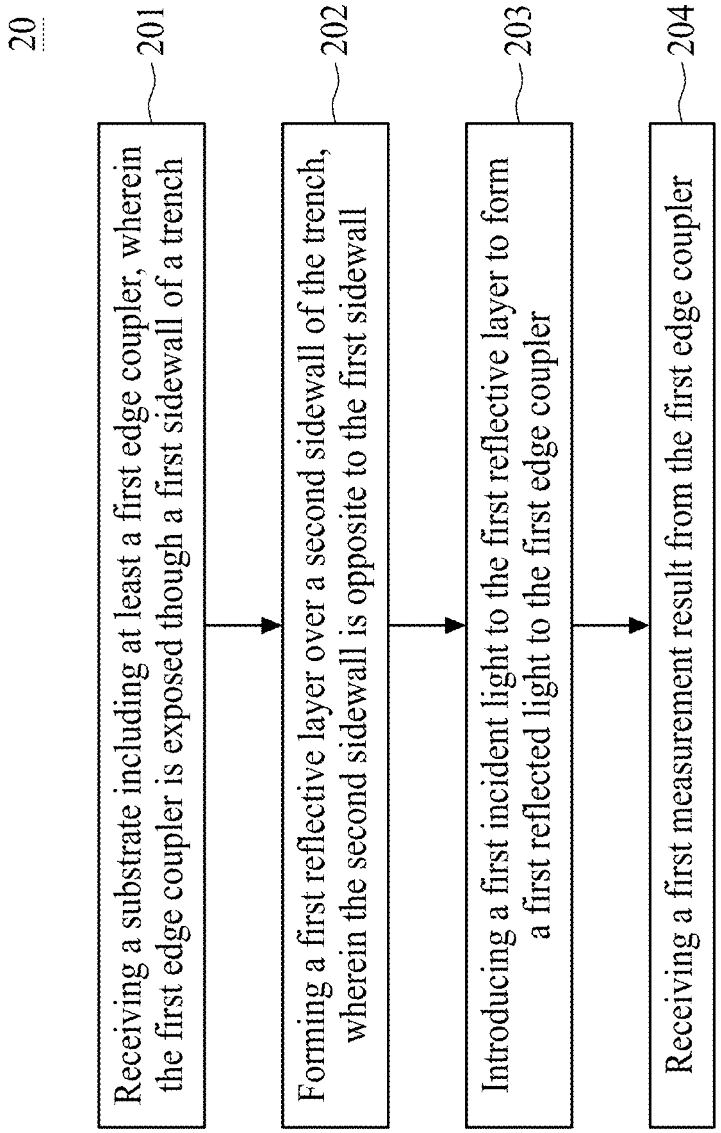
FIG. 18 is a flowchart representing a method for measuring an optical die according to aspects of the present disclosure in one or more embodiments.

Please refer to FIG. 18, in which a flowchart representing a method for measuring an optical die 20 is provided. While the disclosed method 20 is illustrated and described herein as a series of acts or operations, it will be appreciated that an order of the illustrated acts or operations is not to be interpreted in a limiting sense. For example, some operations may be performed in a different order and/or concurrently with other acts or operations apart from those illustrated and/or described herein. In addition, not all illustrated operations may be required to implement one or more aspects or embodiments of the invention described herein. Further, one or more of the operations described herein may be carried out in one or more separate operations and/or phases.

In operation 201, a substrate is received. In some embodiments, the substrate includes at least an edge coupler, and the edge coupler is exposed through a first sidewall of a trench. In some embodiments, a semiconductor structure 10*a*, 10*b*, 11, 12*a*, 12*b*, 13*a*, 13*b*, 14*a*, 14*b*, 15*a*, 15*b*, or 16 including a substrate 104 is received. Referring to FIGS. 1A and 1B, the substrate 104 may include edge couplers 110, 110A and/or 110B. Further, the edge couplers 110, 110A and/or 110B are exposed through sidewalls of a trench 113 or 117. In some embodiments, the edge coupler 110 is said to be adjacent to an edge of an optical die 100. In other embodiments, the edge coupler 110A is adjacent to an edge of an optical die 100A, and the edge coupler 110B is adjacent to an edge of an optical die 100B.

In operation 202, a first reflective layer is formed over a second sidewall of the trench. Referring to FIGS. 2A to 17, for example, a reflective layer 120 or 120A is formed over a first sidewall of the trench 113.

In some embodiments, in operation 202, a second reflective layer may be formed over the first sidewall of the trench. Referring to FIGS. 2A to 17, in such embodiments, the reflective layer 120B is formed over the sidewall opposite to where the reflective layer 120A is disposed. In some embodiments, the reflective layers 120A and 120B are simultaneously formed. As mentioned above, the reflective layer 120A is disposed over and separated from the edge coupler 110A, and the reflective layer 120B is disposed over and separated from the edge coupler 110B. Configurations and arrangements of the reflective layers 120 and 120A are similar to those described above; therefore, details thereof are omitted for brevity.

In operation 203, a first incident light is introduced to the first reflective layer to form a first reflected light, wherein the first reflected light is directed toward the first edge coupler. Referring to FIGS. 3A to 17, an incident light $L_I$ is introduced from an optical fiber 130 or a fiber array 140. The incident light $L_I$ is reflected by the reflective layer 120 or 120A to form a reflected light $L_R$, wherein the reflected light $L_R$ is directed toward the edge couplers 110 or 110B at the opposite sidewall of the trench 130. Additionally, the optical fiber 130 or the fiber array 140 is disposed vertically and directly over the to-be-tested edge coupler 110 or 110B.

In some embodiments, in the operation 203, a second incident light is introduced to the reflective layer 120B to form a second reflected light, wherein the second reflected light is directed toward the edge coupler 110A, as shown in FIG. 3C. In some embodiments, measurements performed on the edge coupler 110A and the edge coupler 110B may be performed sequentially. In other embodiments, the measurements performed on the edge coupler 110A and the edge coupler 110B may be performed concurrently, as shown in FIGS. 15 and 16.

In operation 204, a first measurement result is received from the first edge coupler. As mentioned above, the reflected light $L_R$ enters the to-be-tested edge coupler 110 or 110B, and optical signals are thereby transformed into electrical signals and thus the measurement or the test result is received from such edge coupler.

In some embodiments, in operation 204, a second measurement result is received from the edge coupler 110A.

Embodiments of the present disclosure provide an optical die having a reflective layer for improving practicability of a wafer-level measurement or wafer-level test facility. The reflective layer helps to reflect an incident light to an edge coupler with an included angle formed by the incident light and a reflected light. In such embodiments, an optical fiber that provides the incident light can be kept away from the optical die due to the included angle, thus reducing a possibility of collision between the optical die and the optical fiber.

In some embodiments, a semiconductor structure is provided. The semiconductor structure includes an optical die, a first edge coupler, and a reflective layer. The optical die has a top surface and an edge. The first edge coupler is disposed in the optical die and adjacent to the edge of the optical die. The reflective layer is disposed in the optical die and adjacent to the edge of the optical die. The reflective layer is disposed over the first edge coupler and separated from the first edge coupler.

In some embodiments, a semiconductor structure is provided. The semiconductor structure includes an optical die, a plurality of edge couplers disposed in the optical die, and a metal layer disposed in the optical die. The edge couplers extend in a first direction and are parallel to each other. The metal layer extends in a second direction different from the first direction. The metal layer is separated from the edge couplers in a third direction different from the first and second directions.

In some embodiments, a method for measuring an optical die is provided. The method includes following operations. A substrate is received. The substrate includes at least a first edge coupler. The first edge coupler is exposed through a first sidewall of a trench. A first reflective layer is formed over a second sidewall of the trench. The second sidewall is opposite to the first sidewall. A first incident light is introduced to the first reflective layer to form a first reflected light, wherein the first reflected light is directed toward the first edge coupler. A first measurement result is received from the first edge coupler.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for measuring an optical die, comprising:
receiving a substrate comprising at least a first edge coupler, wherein the first edge coupler is exposed through a first sidewall of a trench;
forming a first reflective layer over a second sidewall of the trench, wherein the second sidewall is opposite to the first sidewall;
introducing a first incident light to the first reflective layer to form a first reflected light, wherein the first reflected light is directed toward the first edge coupler; and
receiving a first measurement result from the first edge coupler,
wherein the first sidewall of the trench has a first portion and a second portion, and an included angle formed by the first portion and the second portion is between approximately 2 degrees and approximately 178 degrees.

2. The method of claim 1, wherein an included angle is formed by the first incident light and a side surface of the first reflective layer.

3. The method of claim 1, wherein the first reflective layer is tilted.

4. The method of claim 1, further comprising:
forming a second reflective layer over the first sidewall of the trench, wherein the substrate further comprises a second edge coupler disposed in the second sidewall, the second reflective layer is disposed over and separated from the first edge coupler, and the first reflective layer is disposed over and separated from the second edge coupler;
introducing a second incident light to the second reflective layer to form a second reflected light, wherein the second reflected light is directed toward the second edge coupler; and
receiving a second measurement result from the second edge coupler.

5. The method of claim 4, wherein the introducing of the first incident light and the introducing of the second incident light are concurrently performed.

6. A method for measuring an optical die, comprising:
receiving a substrate comprising a trench, a first edge coupler exposed through a first sidewall of the trench, and a second edge coupler exposed through a second sidewall of the trench;
forming a first reflective layer over the first sidewall of the trench and a second reflective layer over the second sidewall of the trench;
introducing a first incident light to the first reflective layer to form a first reflected light directed toward the second edge coupler; and
receiving a first measurement result from the second edge coupler.

7. The method of claim 6, wherein the first sidewall of the trench and the second sidewall of the trench are opposite.

8. The method of claim 6, wherein the first reflective layer is separated from the first edge coupler, and the second reflective layer is separated from the second edge coupler.

9. The method of claim 6, wherein the first reflective layer and the second reflective layer comprise a same material.

10. The method of claim 6, wherein the first reflective layer and the second reflective layer have a same thickness.

11. The method of claim 6, wherein a top surface of the first reflective layer is aligned with a top surface of the second reflective layer.

12. The method of claim 6, wherein the first edge coupler and the second edge coupled are identical.

13. The method of claim 6, wherein the first edge coupler and the second edge coupler are different.

14. The method of claim 6, further comprising:
introducing a second incident light to the second reflective layer to form a second reflected light directed toward the first edge coupler; and
receiving a second measurement result from the first edge coupler.

15. The method of claim 14, wherein the introducing of the first incident light and the introducing of the second incident light are concurrently performed.

16. A method for measuring an optical die, comprising:
receiving a substrate comprising a trench, a first edge coupler exposed through a first sidewall of the trench, and a second edge coupler exposed through a second sidewall of the trench, wherein the first sidewall of the trench and the second sidewall of the trench are opposite;
forming a first reflective layer over the first sidewall of the trench and a second reflective layer over the second sidewall of the trench;
introducing a first incident light to the first reflective layer to form a first reflected light directed toward the second edge coupler; and
introducing a second incident light to the second reflective layer to form a second reflected light directed toward the first edge coupler;
receiving a first measurement result from the second edge coupler and a second measurement from the first edge coupler.

17. The method of claim 16, wherein the first edge coupler and the second edge coupler are identical.

18. The method of claim 16, wherein the first edge coupler and the second edge coupler are different.

19. The method of claim 16, wherein the introducing of the first incident light and the introducing of the second incident light are concurrently performed.

20. The method of claim 16, wherein the introducing of the first incident light and the introducing of the second incident light are sequentially performed.

* * * * *